(12) United States Patent
Gotoh et al.

(10) Patent No.: US 10,222,920 B2
(45) Date of Patent: Mar. 5, 2019

(54) TOUCH PANEL DEVICE

(71) Applicant: SHARP KABUSHIKI KAISHA, Sakai, Osaka (JP)

(72) Inventors: Toshimitsu Gotoh, Sakai (JP); Shinichi Miyazaki, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/741,250

(22) PCT Filed: Jul. 6, 2016

(86) PCT No.: PCT/JP2016/069966
§ 371 (c)(1),
(2) Date: Dec. 30, 2017

(87) PCT Pub. No.: WO2017/006952
PCT Pub. Date: Jan. 12, 2017

(65) Prior Publication Data
US 2018/0196547 A1    Jul. 12, 2018

(30) Foreign Application Priority Data

Jul. 8, 2015 (JP) ................................. 2015-136853

(51) Int. Cl.
G06F 3/044 (2006.01)
G06F 3/047 (2006.01)
G06F 3/041 (2006.01)

(52) U.S. Cl.
CPC .............. *G06F 3/044* (2013.01); *G06F 3/047* (2013.01); *G06F 3/0412* (2013.01); *G06F 3/0416* (2013.01); *G06F 2203/04103* (2013.01)

(58) Field of Classification Search
CPC ...... G06F 3/044; G06F 3/0412; G06F 3/0416; G06F 3/047; G06F 2203/04103
See application file for complete search history.

(56) References Cited

U.S. PATENT DOCUMENTS

2011/0210930 A1* 9/2011 Lin ........................ G06F 3/0416
345/173
2013/0093706 A1* 4/2013 Kurasawa ............. G06F 3/0412
345/173

(Continued)

FOREIGN PATENT DOCUMENTS

JP    2013-084168 A    5/2013
WO    2013/065272 A1   5/2013

(Continued)

*Primary Examiner* — Kent W Chang
*Assistant Examiner* — Nathaniel P Brittingham
(74) *Attorney, Agent, or Firm* — ScienBiziP, P.C.

(57) ABSTRACT

Provided is a touch panel device configured to execute touch panel drive processing while appropriately preventing discoloration of a semi in-cell touch panel. A touch panel-equipped display device 1000 includes a touch panel TP and a touch panel controller 1. The touch panel TP is configured as a semi in-cell touch panel, and includes a color filter layer, a sense electrode layer provided with sense electrodes Rx11 Rx38, and a drive electrode layer provided with drive electrodes Tx11 to Tx38. The sense electrode layer and the drive electrode layer oppose each other with the color filter layer interposed therebetween. The touch panel controller 1 generates a drive signal such that an integrated value of a potential difference between the drive electrode and the sense electrode is less than a first value in a predetermined period of driving the touch panel.

6 Claims, 12 Drawing Sheets

(56) References Cited

U.S. PATENT DOCUMENTS

| | | | |
|---|---|---|---|
| 2013/0093722 A1* | 4/2013 | Noguchi | G06F 3/0412 345/174 |
| 2013/0120312 A1* | 5/2013 | Takahashi | G06F 3/0418 345/174 |
| 2013/0335366 A1* | 12/2013 | Lee | G06F 3/044 345/174 |
| 2015/0002421 A1* | 1/2015 | Kim | G06F 3/041 345/173 |
| 2015/0169116 A1 | 6/2015 | Masuda | |
| 2016/0143153 A1* | 5/2016 | Stay | G06F 3/041 349/12 |
| 2017/0262124 A1* | 9/2017 | Gotoh | G02F 1/13338 |
| 2018/0196547 A1* | 7/2018 | Gotoh | G06F 3/044 |

FOREIGN PATENT DOCUMENTS

| | | |
|---|---|---|
| WO | 2014/024683 A1 | 2/2014 |
| WO | 2016/043035 A1 | 3/2016 |

* cited by examiner

TOUCH PANEL DEVICE

TECHNICAL FIELD

The present invention relates to a technique applied to a touch panel device, a display device equipped with a touch panel, and the like.

BACKGROUND ART

A touch panel device is configured to allow an instrument to receive input of information with a finger or a pen touching a touch panel surface. Capacitance touch panel devices excellent in detection sensitivity as well as in operability have been applied to various instruments in recent years. Among these, projection-type capacitance touch panel devices have often been adopted, which achieve accurate detection of coordinates of a position on a touch panel surface touched by a finger or a pen (see Patent Document 1, for example).

A capacitance touch panel device includes a plurality of drive lines and a plurality of sense lines. The drive lines are each provided with a plurality of X-axis sense electrodes, whereas the sense lines are each provided with a plurality of Y-axis sense electrodes. The capacitance touch panel device is configured to sequentially output drive pulse signals to the drive lines and detect electric field change (capacity change) between the X-axis sense electrodes and the Y-axis sense electrodes. Specifically, the capacitance touch panel device detects, on the sense lines, a signal according to electric field change (capacity change) between the X-axis sense electrode and the Y-axis sense electrode, to detect coordinates of a position on a touch panel surface touched by a finger or a pen.

Such a capacitance touch panel device includes a touch panel having X-axis sense electrodes and Y-axis sense electrodes provided in different layers. The touch panel included in the capacitance touch panel device further includes an insulating layer provided between the layer of the X-axis sense electrodes and the layer of the Y-axis sense electrodes.

The touch panel in the capacitance touch panel device is driven in accordance with drive signals. The sense lines apply predetermined voltage (bias voltage) to cause the Y-axis sense electrodes to have predetermined potential within a predetermined period.

FIG. 11 indicates (exemplary) signal waveforms of a drive signal Tx1 and a sense signal Rx1.

In FIG. 11, the drive signal Tx1 is used to drive, via a first drive line, the X-axis sense electrodes connected to the first drive line. The sense signal Rx1 is used to detect, on the sense lines, a signal according to electric field change (capacity change) between the X-axis sense electrode and the Y-axis sense electrode, and is biased to predetermined potential Vr (e.g. Vr=1.65 [V]) while a predetermined drive line is driven.

A touch panel device is configured generate an electric field on a touch panel surface in accordance with such a drive signal, and includes a receiver configured to receive, via the sense line, a signal (sense signal) according to electric field change caused by touch to the touch panel surface. The tooth panel device is further configured to specify (detect) a touched position on the touch panel surface in accordance with the signal received by the receiver.

CITATION LIST

Patent Document

Patent Document 1: WO 2013/065272 A

SUMMARY OF INVENTION

Technical Problem

The above method of driving a touch panel device (a conventional touch panel driving method) is appropriately applicable to a touch panel-equipped display device including a display panel (e.g. a liquid crystal display panel) and a touch panel provided separately from the display panel.

Assume that a touch panel (hereinafter, referred to as a "semi in-cell touch panel") includes a sense electrode layer (Rx electrode layer) made of indium tin oxide (ITO) and provided on a color filter of a display panel (e.g. a liquid crystal display panel), and a drive electrode layer (Tx electrode layer) made of metal and provided between the color filter and the display panel. When the touch panel is driven in accordance with the above method of driving a touch panel device, the sense electrode layer (Rx electrode layer) made of ITO is occasionally discolored.

A semi in-cell touch panel includes a layer having sense electrodes (a sense electrode layer (Rx electrode layer)), which is typically provided thereon with adhesive glue.

In a case where the semi in-cell touch panel is driven in accordance with the conventional touch panel driving method positive voltage (Vr) is constantly applied to the sense electrodes while the touch panel is driven, as apparent from FIG. 11. The sense electrodes are thus reduced on surfaces thereof (by oxidation-seduction reaction) to cause refractive index change of sense electrode portions.

This will be described with reference to FIG. 12.

FIG. 12 is a summary sectional view depicting part of a display device including a semi in-cell touch panel. Specifically, FIG. 12 depicts a layer CF (e.g. a glass layer) provided with a color filter, a sense electrode Rx provided on the layer CF and made of ITO, a drive electrode Tx opposing the sense electrode Rx with the layer CF interposed therebetween, and glue GL protecting a layer provided with the sense electrode Rx (a sense electrode layer) and joining (firmly fixing) a polarizing plate disposed above the layer of the sense electrode Rx to the layer CF.

When the semi in-cell touch panel is driven in accordance with the conventional touch panel driving method, positive voltage (Vr) is constantly applied to the sense electrode while the touch panel is driven. This leads to discoloration of the touch panel made of ITO. The semi in-cell touch panel, which is driven in accordance with the conventional touch panel driving method, is occasionally discolored.

In view of the above problem, it is an object of the present invention to provide a touch panel device configured to execute touch panel drive processing while appropriately preventing discoloration of a semi in-cell touch panel.

Solution to Problem

In order to achieve the object mentioned above, a first configuration relates to a touch panel device including a color filter glass layer to be provided with a color filter, a touch panel, and a touch panel control unit.

The touch panel includes (1) a touch panel first layer provided on the color filter glass layer and including a sense electrode made of a transparent conductive film, and (2) a touch panel second layer including a drive electrode.

The touch panel control unit generates a drive signal such that an integrated value of a potential difference between the drive electrode and the sense electrode (an electric field generated between the drive electrode and the sense electrode) is less than a predetermined value in a predetermined period of driving the touch panel.

Effect of Invention

The present invention achieves a touch panel device configured to execute touch panel drive processing while appropriately preventing discoloration of a semi in-cell touch panel.

DESCRIPTION OF EMBODIMENTS

First Embodiment

The first embodiment of the present invention will now be described below with reference to the drawings.

The following description refers to a touch panel-equipped display device exemplifying a device including a touch panel device.

The touch panel device according to the present embodiment is configured to generate a drive signal such that an integrated value of a potential difference (electric field) between a drive electrode and a sense electrode is less than a predetermined value in a predetermined period of driving the touch panel, to prevent current from flowing unevenly in one direction between the drive electrode and the sense electrode in the predetermined period of driving the touch panel.

<1.1 Configuration of Touch Panel-Equipped Display Device>

Figure 1:
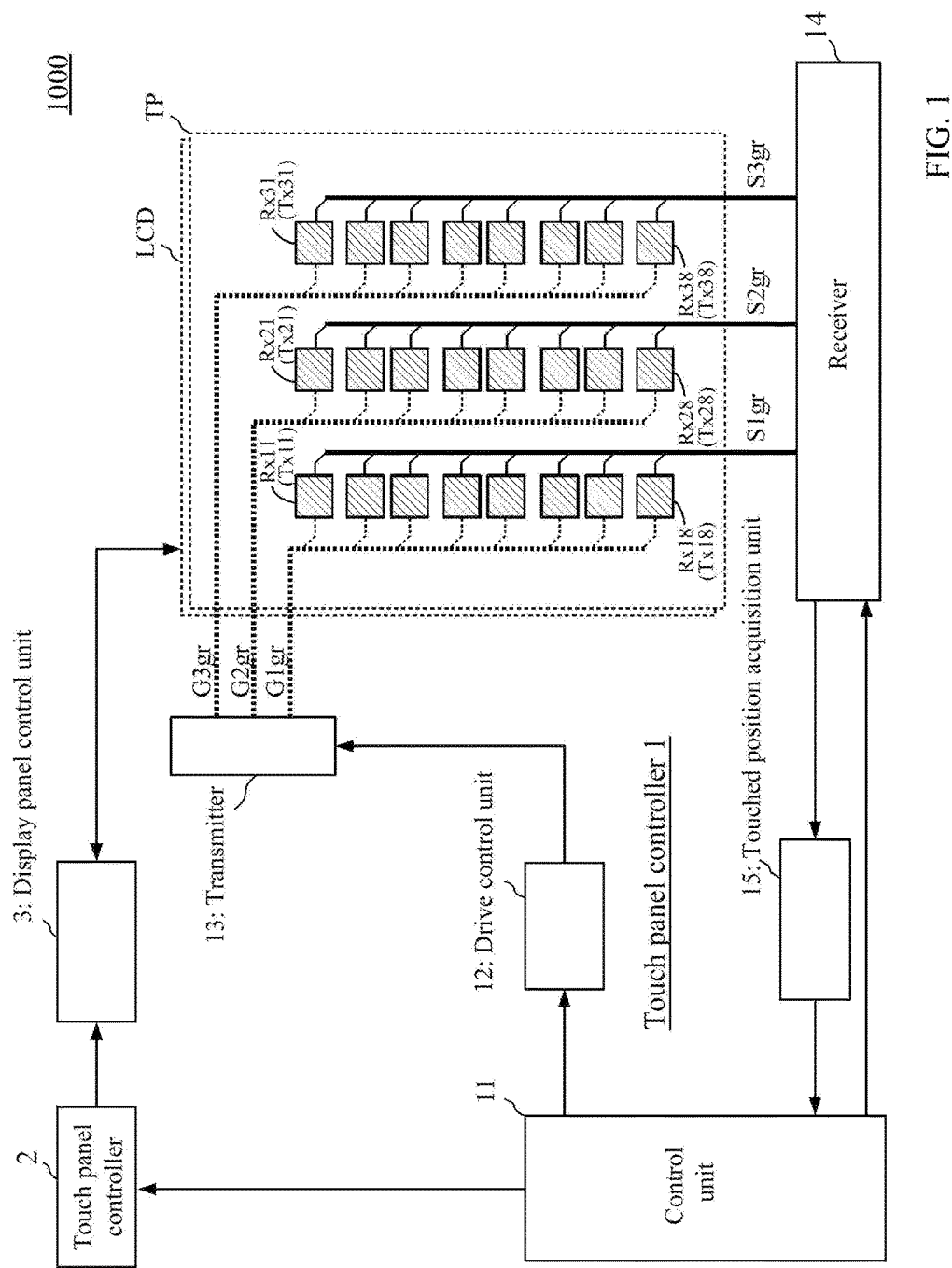
FIG. 1 is a schematic configuration diagram of a touch panel-equipped display device 1000 according to a first embodiment.

FIG. 1 is a schematic configuration diagram of a touch panel-equipped display device 1000.

Figure 2:
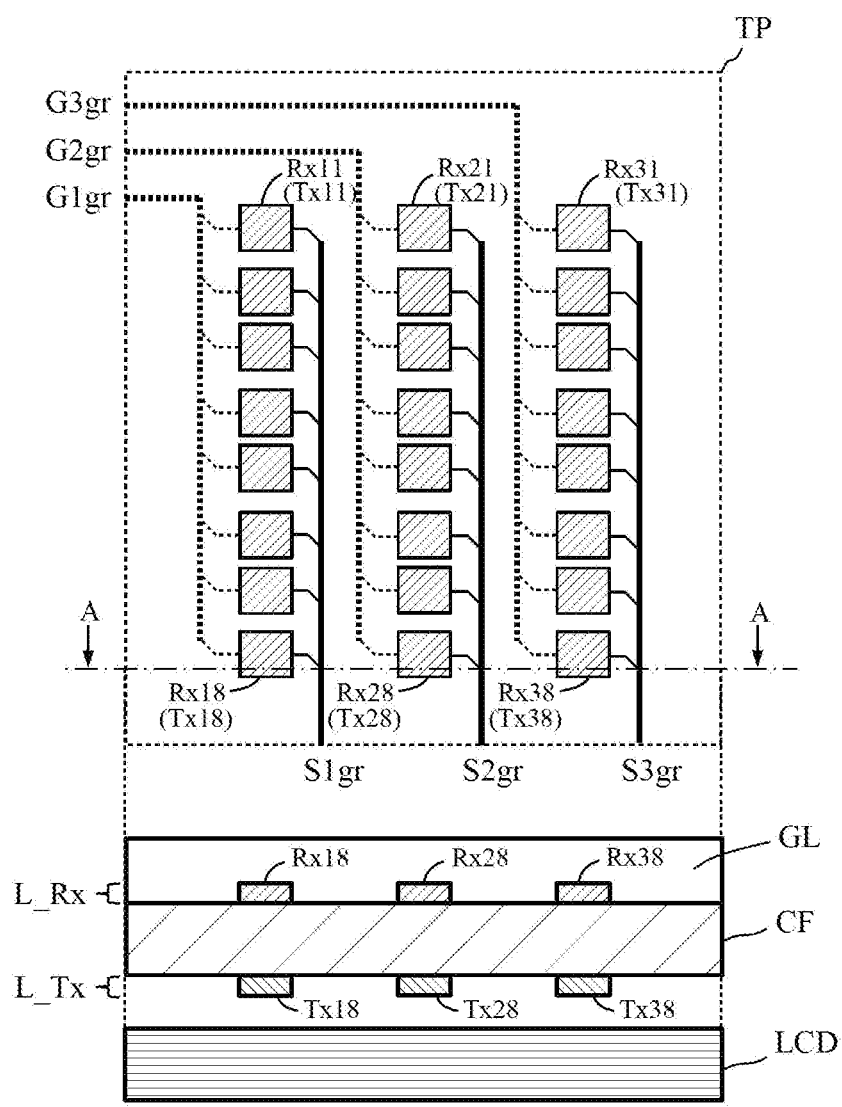
FIG. 2 depicts a summary plan view of a touch panel TP of the touch panel-equipped display device 1000 according to the first embodiment (in an upper portion), and a summary sectional view taken along line A-A.

FIG. 2 depicts a summary plan view of a touch panel TP of the touch panel-equipped display device 1000 (in an upper portion), and a summary sectional view taken along line A-A.

Figure 3:
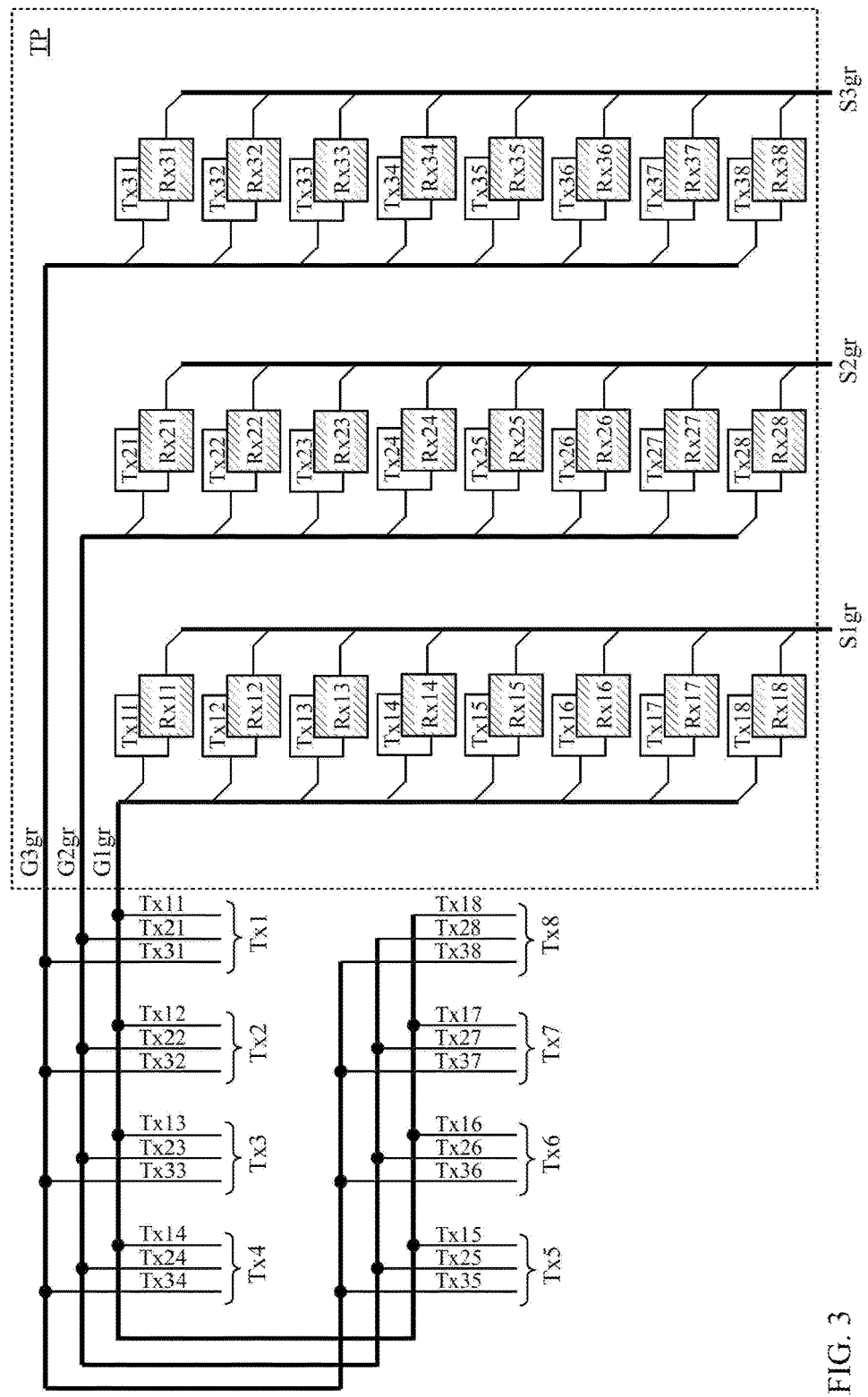
FIG. 3 is a schematic configuration diagram of the touch panel TP.

FIG. 3 is a schematic configuration diagram of the touch panel TP. FIG. 3 depicts sense electrodes Rx11 to Rx18, Rx21 to Rx28, and Rx31 to Rx38 and drive electrodes Tx11 to Tx18, Tx21 to Tx28, and Tx31 to Tx38. The sense electrodes are displaced diagonally from the drive electrodes for distinction between the sense electrodes and the drive electrodes.

As depicted in FIG. 1, the touch panel-equipped display device 1000 includes a display panel (e.g. a liquid crystal display or an organic EL display) LCD, the touch panel TP, a touch panel controller 1, a display panel control unit 2, and a display panel drive unit 3.

As depicted in FIG. 1, the touch panel controller 1 includes a control unit 11, a drive control unit 12, a transmitter 13, a receiver 14, and a touched position acquisition unit 15.

As depicted in FIG. 3, the touch panel TP configured by a sense electrode layer (Rx electrode layer) L_Rx including sense electrodes (the sense electrodes Rx11 to Rx18, Rx21 to Rx28, and Rx31 to Rx38 depicted in FIG. 2) provided on a color filter CF of the display panel LCD and made of indium tin oxide (ITO), and a drive electrode layer (Tx electrode layer) L_Tx including drive electrodes (the drive electrodes Tx11 to Tx18, Tx21 to Tx28, and Tx31 to Tx38 depicted in FIG. 2) (drive electrodes having a mesh pattern structure of thin metallic wires made of copper or the like) provided between the color filter CF and the display panel LCD and made of metal. The touch panel TP is configured as a semi in-cell touch panel. As depicted in FIG. 2, glue GL is applied to an area provided with no sense electrode in the sense electrode layer L_Rx, and onto the sense electrode layer L_Rx, to join (firmly fix) a polarizing plate disposed above the sense electrode layer L_Rx to the color filter layer CF.

The touch panel TP covers a display surface (not depicted) of the display panel LCD, and outputs, to the touch panel controller 1, an amount of change in electric field or the like caused on a touch panel surface by a finger or a pen (touch pen) touching the touch panel surface as predetermined physical quantity (e.g. an amount of current or voltage generated by electric field change).

As depicted in FIGS. 1 to 3, the touch panel TP includes the drive electrodes Tx11 to Tx38 provided in the drive electrode layer L_Tx and the sense electrodes Rx11 to Rx38 provided in the sense electrode layer L_Rx. As depicted in FIGS. 1 to 3, the touch panel TP further includes drive lines respectively connected to the drive electrodes Tx1 to Tx38

(e.g. drive lines provided in the drive electrode layer L_Tx), and sense lines respectively connected to the sense electrodes Rx11 to Rx38 (e.g. sense lines provided in the sense electrode layer L_Rx). FIGS. 1 to 3 depict, for convenience, the plurality of drive lines collectively as drive lines G1$gr$ to G3$gr$, and the plurality of sense lines collectively as sense lines S1$gr$ to S3$gr$.

Specifically, (1) the drive lines G1$gr$ collectively indicate drive lines respectively connected to the drive electrodes Tx11 to Tx18,
(2) the drive lines G2$gr$ collectively indicate drive lines respectively connected to the drive electrodes Tx21 to Tx28, and
(3) the drive lines G3$gr$ collectively indicate drive lines respectively connected to the drive electrodes Tx31 to Tx38.

Furthermore, (1) the sense lines S1$gr$ collectively indicate drive lines respectively connected to the sense electrodes Rx11 to Rx18,
(2) the sense lines S2$gr$ collectively indicate drive lines respectively connected to the sense electrodes Rx21 to Rx28, and
(3) the sense lines S3$gr$ collectively indicate drive lines respectively connected to the sense electrodes Rx31 to Rx38.

In the touch panel TP the drive electrodes Tx1 to Tx38 and the drive lines G1$gr$ to G3$gr$ are provided in the drive electrode layer L_Tx, and the sense electrodes Rx11 to Rx38 and the plurality of drive lines are provided in the sense electrode layer L_Rx.

As depicted in FIG. 1, the touch panel controller 1 includes the control unit 11, the drive control unit 12, the transmitter 13, the receiver 14, and the touched position acquisition unit 15.

The control unit 11 is configured to control functional parts of the touch panel controller 1.

The control unit 11 outputs, to the drive control 12, a control signal for drive of the touch panel TP.

The control unit 11 further receives information on a touched position from the touched position acquisition unit 15.

The control unit 11 also outputs, to the display panel control unit 2, the information on the touched position outputted from the touched position acquisition unit 15.

The control unit 11 also outputs, to the receiver 14, a control signal for drive of the touch panel TP, and a control signal for reception at predetermined timing by the receiver 14 of signals from the sense electrodes of the touch panel TP.

The drive control unit 12 outputs, to the transmitter 13, a control signal for a command for the transmitter 13 to output a drive signal to the touch panel TP via each of the drive lines in accordance with the control signal outputted from the control unit 11.

The transmitter 13 outputs, from each of the drive lines, a drive signal (drive pulse signal) in accordance with the control signal outputted from the drive control unit 12.

The receiver 14 controls, in accordance with the control signal from the control unit 11, to cause the sense electrodes of the touch panel TP to have predetermined potential (receive predetermined bias voltage) at predetermined timing.

The receiver 14 further detects electric field change caused on the sense lines S1$gr$ to S3$gr$ by a physical object touching the touch panel surface of the touch panel TP. Specifically, the drive signal (drive pulse signal) outputted from the transmitter 13 to each of the drive lines leads to generation of an electric field between the drive electrode and the sense electrode (e.g. between the drive electrode Tx11 and the sense electrode Rx11). When the physical object touches the much panel surface of the touch panel TP, the electric field changes between the drive electrode and the sense electrode disposed adjacent to the touching physical object. The receiver 14 then receives, via the sense lines, a signal according to the electric field change. Specifically, the receiver 14 receives, via the sense lines S1$gr$ to S2$gr$, a signal (sense signal) according to the electric field change caused by the physical object touching the touch panel surface of the touch panel TP. The receiver 14 then outputs the received sense signal to the touched position acquisition unit 15.

The touched position acquisition unit 15 receives the sense signal outputted from the receiver 14. The touched position acquisition unit 15 specifies, in accordance with the sense signal, a position (position coordinates) in contact with (touched by) the physical object on the touch panel surface of the touch panel TP. The touched position acquisition unit 15 then outputs, to the control unit 11, information on the specified position (information on the touched position).

The display panel control unit 2 receives the information on the touched position outputted from the control unit 11. The display panel control unit 2 specifies data (display data) to be displayed on the display panel LCD in accordance with the inputted information on the touched position. The display panel control unit 2 then outputs, to the display panel drive unit 3, a command signal for display of the specified display data on the display panel LCD.

The display panel drive unit 3 receives the command signal outputted from the display panel control unit 2, and drive controls the display panel LCD in accordance with the command signal to cause the display data to be displayed on the display panel LCD.

<1.2 Behavior of Touch Panel-Equipped Display Device>

The touch panel-equipped display device 1000 thus configured will be described below in terms of its behavior.

Figure 4:
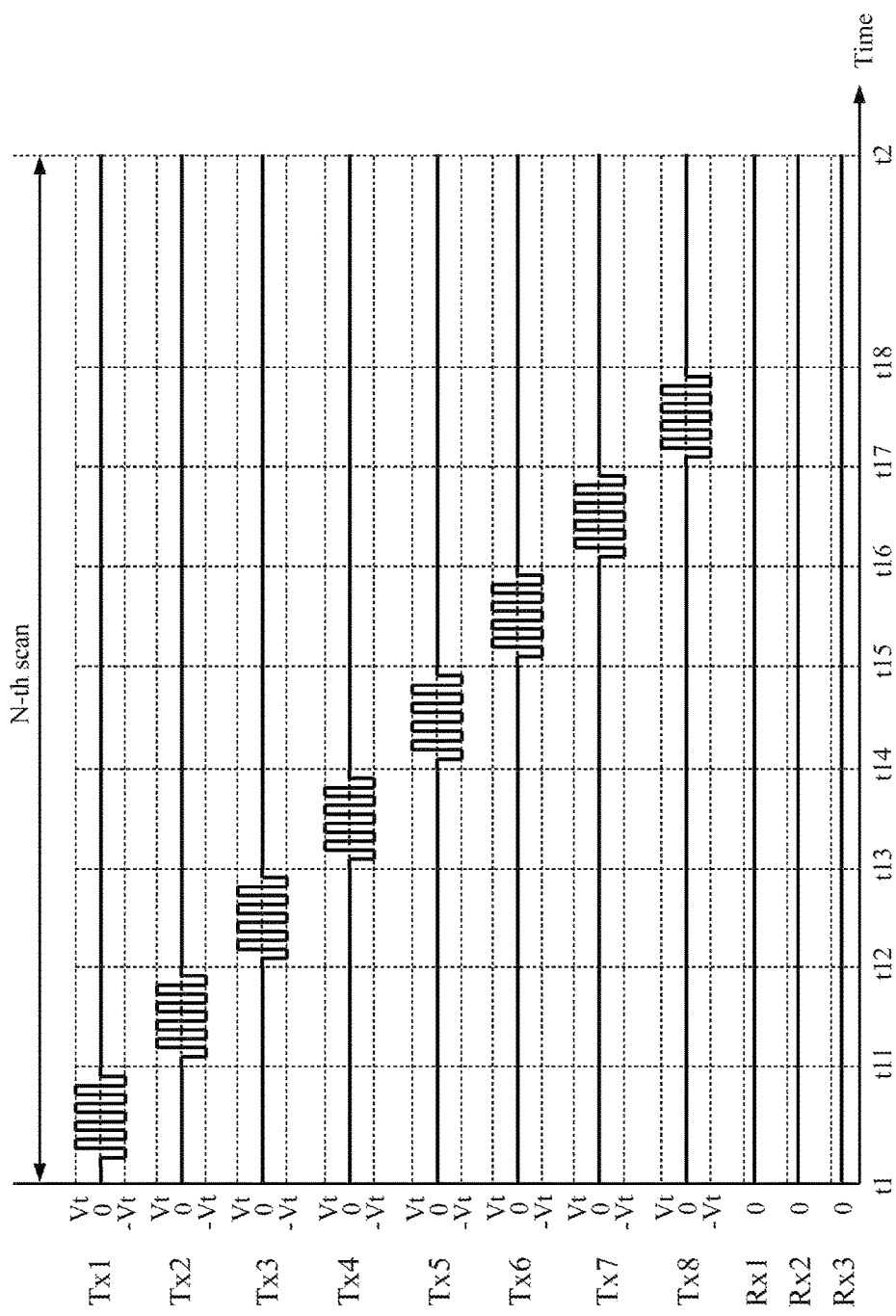
FIG. 4 is a chart indicating signal waveforms of drive signals Tx1 to Tx8 and sense signals Rx1 to Rx3 during an N-th scan (N is an integer) interval (from time t1 to time t2) (the first embodiment).

FIG. 4 is a chart indicating signal waveforms of drive signals Tx1 to Tx8 and the sense signals Rx1 to Rx3 during an N-th scan (N is an integer) interval (from time t1 to time t2).

Figure 5:
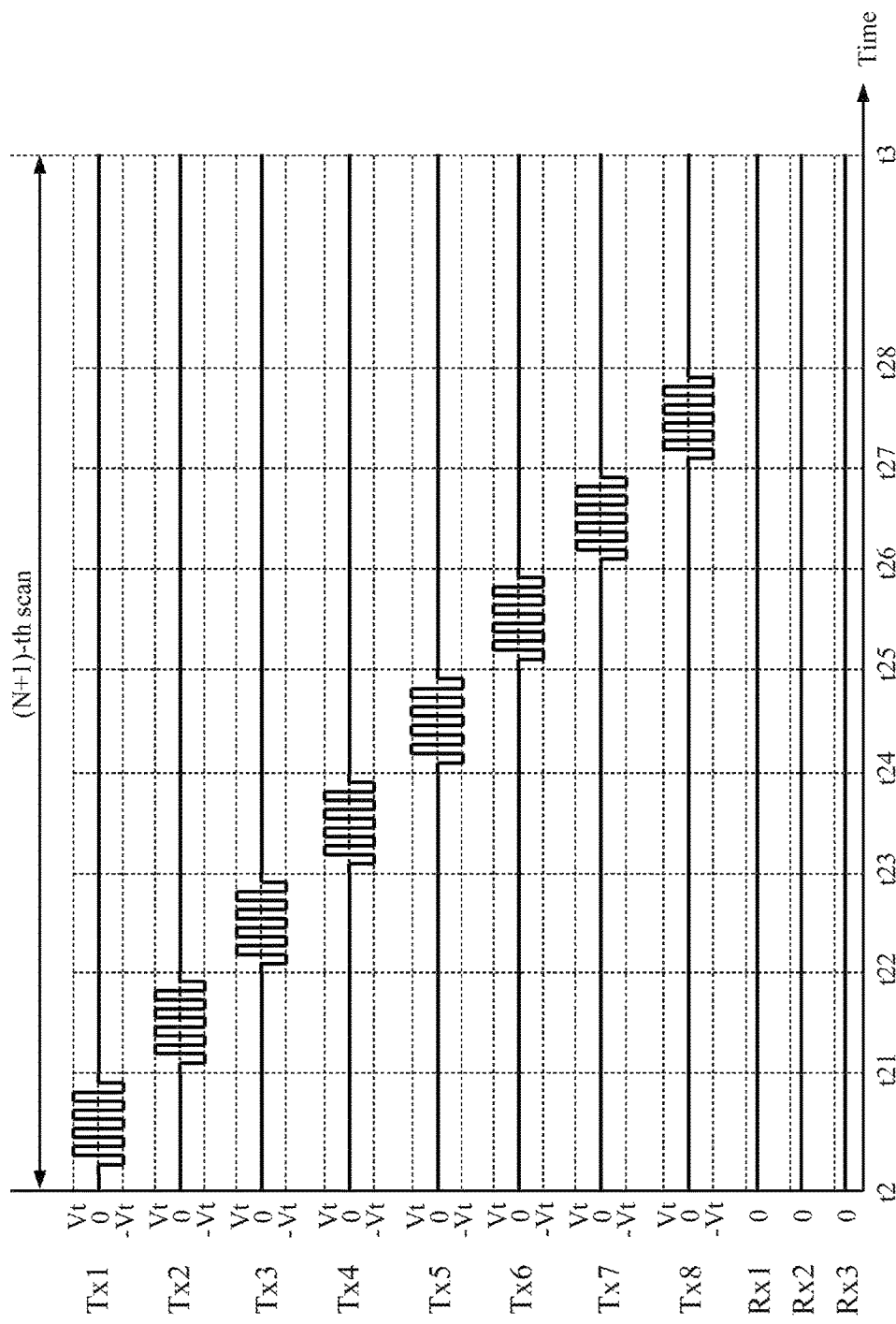
FIG. 5 is a chart indicating signal waveforms of the drive signals Tx1 to Tx8 and the sense signals Rx1 to Rx3 during an (N+1)-th scan interval (from time t2 to time t3) (the first embodiment).

FIG. 5 is a chart indicating signal waveforms of the drive signals Tx1 to Tx8 and the sense signals Rx1 to Rx3 during an (N+1)-th scan interval than time t2 to time t3).

(A1) The drive signal Tx1 is a signal for drive of the drive electrodes Tx11, Tx21, and Tx31.
(A2) The drive signal Tx2 is a signal for drive of the drive electrodes Tx12, Tx22, and Tx32.
(A3) The drive signal Tx3 is a signal for drive of the drive electrodes Tx13, Tx23, and Tx33.
(A4) The drive signal Tx4 is a signal for drive of the drive electrodes Tx14, Tx24, and Tx34.
(A5) The drive signal Tx5 is a signal for drive of the drive electrodes Tx15, Tx25, and Tx35.
(A6) The drive signal Tx6 is a signal for drive of the drive electrodes Tx16, Tx26, and Tx36.
(A7) The drive signal Tx7 is a signal for drive of the drive electrodes Tx17, Tx27, and Tx37.
(A8) The drive signal Tx8 is a signal for drive of the drive electrodes Tx18, Tx28, and Tx38.
(B1) The sense signal Rx1 is received from the sense electrodes Rx11 to Rx18.
(B2) The sense signal Rx2 is received from the sense electrodes Rx21 to Rx28.
(B3) The sense signal Rx3 is received from the sense electrodes Rx31 to Rx38.

The touch panel-equipped display device 1000 will be described below in terms of its behavior with reference to the timing charts of FIGS. 4 and 5.

(Period from Time t1 to Time t11):

In the period from time t1 to time t11, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx11, Tx21, and Tx31 via the drive lines G1*gr* to G3*gr*. As indicated in FIG. 4, the transmitter 13 outputs, in the period from time t1 to time t11, to the drive electrodes Tx11, Tx21, and Tx31 is the drive lines G1*gr* to G3*gr*, the drive signal Tx1 as a pulse signal having a signal value (voltage value) alternately changing between +Vt (Vt>0, e.g. Vt=5 [V]) and −Vt.

In the period from time t1 to time t2, the receiver 14 does not apply bias voltage to the sense electrodes such that all the sense electrodes Rx1 to Rx3 have potential equal to 0 [V].

The receiver 14 is alternatively configured (1) to apply bias voltage to the sense electrodes Rx11, Rx21, and Rx31 via the sense lines such that these sense electrodes have potential Vr (Vr≥0, e.g. Vr=1.65 [V]), and (2) to apply bias voltage to the sense electrodes other than the sense electrodes Rx11, Rx21, and Rx31 via the sense lines such that these sense electrodes have potential −Vr (Vr≥0, e.g. Vr=1.65 [V]), in the period from time t1 to time t11.

Such control repetitively brings the touch panel-equipped display device 1000, while the drive electrodes Tx1, Tx21, and Tx31 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V]), electrons contained in the glue on the sense electrode layer L_Rx are attracted (shifted) toward the drive electrodes having the positive potential (toward the sense electrodes). In the other state where (2) the drive electrodes are lower in potential than the sense electrodes and have negative potential −Vt (e.g. −5 [V]), repulsive force is applied between the electrons contained in the glue on the sense electrode layer L_Rx and the drive electrodes having the negative potential, and the electrons contained in the glue on the sense electrode layer L_Rx are shifted to be away from the drive electrodes having the negative potential (away from the sense electrodes).

The control described above thus cases the touch panel-equipped display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx11, Tx21, and Tx31 are not driven in the period from time t1 to time t11. The transmitter 13 is thus brought into a state of outputting no drive signal to the drive electrodes other than the drive electrodes Tx11, Tx21, and Tx31 such that the drive electrodes other than the drive electrodes Tx11, Tx21, and Tx31 have potential equal to 0 [V].

(Period from Time t11 to Time t12):

In the period from time t11 to time t12, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx12, Tx22, and Tx32 via the drive lines G1*gr* to G3*gr*. As indicated in FIG. 4, the transmitter 13 outputs, in the period from time t11 to time t12, to the drive electrodes Tx12, Tx22, and Tx32 via the drive lines G1*gr* to G3*gr*, the drive signal Tx2 as a pulse signal having a signal value (voltage value) alternately changing between +Vt (Vt>0, e.g. Vt=5 [V]) and −Vt.

In the period from time t11 to time t12, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx12, Rx22, and Rx32 via the sense lines such that these sense electrodes have potential Vr (Vr≥0, e.g. Vr=1.65 [V]), and (2) to apply bias voltage to the sense electrodes other than the sense electrodes Rx12, Rx22, and Rx32 via the sense lines such that these sense electrodes have potential −Vr (Vr≥0, e.g. Vr=1.65 [V]), in the period from time t11 to time t12.

Such control repetitively brings the touch panel-quipped display device 1000, while the drive electrodes Tx12, Tx22, and Tx32 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V]), electrons contained in the glue on the sense electrode layer L_Rx are attracted (shifted) toward the drive electrodes having the positive potential (toward the sense electrodes). In the other state where (2) the drive electrodes are lower in potential than the sense electrodes and have negative potential −Vt (e.g. −5 [V]), repulsive force is applied between the elections contained in the glue on the sense electrode layer L_Rx and the drive electrodes having the negative potential, and the electrons contained in the glue on the sense electrode layer L_Rx are shifted to be away from the drive electrodes having the negative potential (away from the sense electrodes).

The control described above thus causes the touch panel-equipped display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx12, Tx22, and Tx32 are not driven in the period from time t11 to time t12. The transmitter 13 is thus brought into a state of outputting no drive signal to the drive electrodes other than the drive electrodes Tx12, Tx22, and Tx32 such that the drive electrodes other than the drive electrodes Tx12, Tx22, and Tx32 have potential equal to 0 [V].

(Period from Time t12 to Time t13):

In the period from time t12 to time t13, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx13, Tx23, and Tx33 via the drive lines G1*gr* to G3*gr*. As indicated in FIG. 4, the transmitter 13 outputs, in the period from time t12 to time t13, to the drive electrodes Tx13, Tx23, and Tx33 via the drive lines G1gr to G3gr, the drive signal Tx3 as a pulse signal having a signal value (voltage value) alternately changing between +Vt (Vt>0, e.g. Vt=5 [V]) and −Vt.

In the period from time t12 to time t13, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx13, Rx23, and Rx33 via the sense lines such that these sense electrodes have potential Vr (Vr≥0, e.g. Vr=1.65 [V]), and (2) to apply bias voltage to the sense electrodes other than the sense electrodes Rx13, Rx23, and Rx33 via the sense lines such that these sense electrodes have potential −Vr (Vr≥0, e.g. Vr=1.65 [V]), in the period from time t12 to time t13.

Such control repetitively brings the touch panel-equipped display device 1000, while the drive electrodes Tx13, Tx23, and Tx33 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V], electrons contained in the glue on the sense electrode layer L_Rx are attracted (shifted) toward the drive electrodes having the positive potential (toward the sense electrodes). In the other state where (2) the drive electrodes are lower in potential than the sense electrodes and have negative potential −Vt (e.g. −5 [V], repulsive force is applied between the electrons contained in the glue on the sense electrode layer L_Rx and the drive electrodes having the negative potential, and the electrons contained in the glue on the sense electrode layer L_Rx are shifted to be away from the drive electrodes having the negative potential (away from the sense electrodes).

The control described above thus causes the touch panel-equipped display device 1000 to appropriately prevent the electrons contained in the glue applied onto the sense electrode layer from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx13, Tx23, and Tx33 are not driven in the period from time t12 to time t13. The transmitter 13 is thus brought into a state of outputting no drive signal to the drive electrodes other than the drive electrodes Tx13, Tx23, and Tx33 such that the drive electrodes other than the drive electrodes Tx13, Tx23, and Tx33 have potential equal to 0 [V], (Period from Time t13 to Time t14):

In the period from time t13 to time t14, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx14, Tx24, and Tx34 via the drive lines G1gr to G3gr. As indicated in FIG. 4, the transmitter 13 outputs, in the period from time t13 to time t14, to the drive electrodes Tx14, Tx24, and Tx34 via the drive lines G1gr to G3gr, the drive signal Tx4 as a pulse signal having a signal value (voltage value) alternately changing between +Vt (Vt>0, e.g. Vt=5 [V]) and −Vt.

In the period from time t13 to time t14, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx14, Rx24, and Rx34 via the sense lines such that these sense electrodes have potential Vr (Vr≥0, e.g. Vr=1.65 [V]), and (2) to apply bias voltage to the sense electrodes other than the sense electrodes Rx14, Rx24, and Rx34 via the sense lines such that these sense electrodes have potential −Vr (Vr≥0, e.g. Vr=1.65 [V]), in the period from time t13 to time t14.

Such control repetitively brings the touch panel-equipped display device 1000, while the drive electrodes Tx14, Tx24, and Tx34 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V], electrons contained in the glue on the sense electrode layer L_Rx are attracted (shifted) toward the drive electrodes having the positive potential (toward the sense electrodes). In the other state where (2) the drive electrodes are lower in potential than the sense electrodes and have negative potential −Vt (e.g. −5 [V], repulsive force is applied between the electrons contained in the glue on the sense electrode layer L_Rx and the drive electrodes having the negative potential, and the electrons contained in the glue on the sense electrode layer L_Rx are shifted to be away from the drive electrodes having the negative potential (away from the sense electrodes).

The control described above thus causes the touch panel-equipped display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately present refractive index change of sense electrode portions.

The drive electrodes other than the drive electrodes Tx14, Tx24, and Tx34 are not driven in the period from time t13 to time t14. The transmitter 13 is thus brought into a state of outputting no drive signal to the drive electrodes other than the drive electrodes Tx14, Tx24, and Tx34 such that the drive electrodes other than the drive electrodes Tx14, Tx24, and Tx34 have potential equal to 0 [V].

(Period from Time t14 to Time t15):

In the period from time t14 to time t15, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx15, Tx25, and Tx35 via the drive lines G1gr to G3gr. As indicated in FIG. 4, the transmitter 13 outputs, in the period from time t14 to time t15, to the drive electrodes Tx15, Tx25, and Tx35 is the drive lines G1gr to G3gr, the drive signal Tx5 as a pulse signal having a signal value (voltage value) alternately changing between +Vt (Vt>0, e.g. Vt=5 [V]) and −Vt.

In the period from time t14 to time t15, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx15, Rx25, and Rx35 via the sense lines such that these sense electrodes have potential Vr (Vr≥0, e.g. Vr=1.65 [V]), and (2) to apply bias voltage to the sense electrodes other than the sense electrodes Rx15, Rx25, and Rx35 via the sense lines such that these sense electrodes have potential −Vr (Vr≥0, e.g. Vr=1.65 [V]), in the period from time t14 to time t15.

Such control repetitively brings the touch panel-equipped display device 1000, while the drive electrodes Tx15, Tx25, and Tx35 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically in the state where (1) the drive electrodes are higher in potential than the sense electrodes and have positive potential +Vt (e.g. 5 [V], electrons contained in the glue on the sense electrode layer L_Rx are attracted (shifted) toward the drive electrodes having the positive potential (toward the sense electrodes). In the other state where (2) the drive electrodes are lower in potential than the sense electrodes and have negative potential −Vt (e.g. −5 [V]), repulsive force is applied between the electrons contained in the glue on the sense electrode layer L_Rx and the drive electrodes having the negative potential, and the electrons contained in the glue on the sense electrode layer L_Rx are shifted to be away from the drive electrodes having the negative potential away from the sense electrodes).

The control described above thus causes the touch panel-equipped display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx15, Tx25, and Tx35 are not driven in the period from time t14 to time t15. The transmitter 13 is thus brought into a state of outputting no drive signal to the drive electrodes other than the drive electrodes Tx15, Tx25, and Tx35 such that the drive electrodes other than the drive electrodes Tx15, Tx25, and Tx35 have potential equal to 0 [V].

(Period from Time t15 to Time t16):

In the period from time t15 to time t16, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx16, Tx26, and Tx36 via the drive lines G1*gr* to G3*gr*. As indicated in FIG. 4, the transmitter 13 outputs, in the period frim time t15 to time t16, to the drive electrodes Tx16, Tx26, and Tx36 via the drive lines G1*gr* to G3*gr*, the drive signal Tx6 as a pulse signal having a signal value (voltage value) alternately changing between +Vt (Vt>0, e.g. Vt=5 [V]) and −Vt.

In the period from time t15 to time t16, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx16, Rx26, and Rx36 via the sense lines such that these sense electrodes have potential Vr (Vr≥0, e.g. Vr=1.65 [V]), and (2) to apply bias voltage to the sense electrodes other than the sense electrodes Rx16, Rx26, and Rx36 via the sense lines such that these sense electrodes have potential −Vr (Vr≥0, e.g. Vr=1.65 [V]), in the period from time t15 to time t16.

Such control repetitively brings the touch panel-equipped display device 1000, while the drive electrodes Tx16, Tx26, and Tx36 are driven into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V]), electrons contained in the glue on the sense electrode layer L_Rx are attracted (shifted) toward the drive electrodes having the positive potential (toward the sense electrodes). In the other state where (2) the drive electrodes are lower potential than the sense electrodes and have negative potential −Vt (e.g. −5 [V], repulsive force is applied between the electrons contained in the glue on the sense electrode layer L_Rx and the drive electrodes having the negative potential, and the electrons contained in the glue on the sense electrode layer L_Rx are shifted to be away from the drive electrodes having the negative potential (away from the sense electrodes).

The control described above thus causes the touch panel-equipped display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx16, Tx26, and Tx36 are not driven in the period from time t15 to time t16. The transmitter 13 is thus brought into a state of outputting signal to the drive electrodes other than the drive electrodes Tx16, Tx26, a Tx36 such that the drive electrodes other than the drive electrodes Tx16, Tx26, and Tx36 have potential equal to 0 [V].

(Period from Time t16 to Time t17):

In the period from time t16 to time t17, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx17, Tx27, and Tx37 via the drive lines G1*gr* to G3*gr*. As indicated in FIG. 4, the transmitter 13 outputs, in the period from time t16 to time t17, to the drive electrodes Tx17 and Tx37 via the drive lines G1*gr* to G3*gr*, the drive signal Tx7 as a pulse signal having a signal value (voltage value) alternately changing between +Vt (Vt>0, e.g. Vt=5 [V]) and −Vt.

In the period from time t1 to time t17, the receiver 14 does not apply bias voltage to the sense electrodes such that all the sense electrodes Rx11 to Rx38 have potential to 0 [V].

The receiver 14 is alternatively configured (1) to apply bias voltage to the sense electrodes Rx17, Rx27, and Rx37 via the sense lines such that these sense electrodes have potential Vr (Vr≥0, e.g. Vr=1.65 [V]), and (2) to apply bias voltage to the sense electrodes other than the sense electrodes Rx17, Rx27, and Rx37 via the sense lines such that these sense electrodes have potential −Vr (Vr≥0, e.g. Vr=1.65 [V]), in the period from time t16 to time t17.

Such control repetitively brings the touch panel-equipped display device 1000, while the drive electrodes Tx17, Tx27, and Tx37 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V]), electrons contained in the glue on the sense electrode layer L_Rx are attracted (shifted) toward the drive electrodes having the positive potential (toward the sense electrodes). In the other state where (2) the drive electrodes are lower in potential than the sense electrodes and have negative potential −Vt (e.g. −5 [V]), repulsive force is applied between the electrodes contained in the glue on the sense electrode layer L_Rx and the drive electrodes having the negative potential, and the electrons contained in the glue on the sense electrode layer L_Rx are shifted to be away from the drive electrodes having the negative potential (away from the sense electrodes).

The control described above thus causes the touch panel-equipped display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx17, Tx27, and Tx37 are not driven in the period from time t16 to time t17. The transmitter 13 is thus brought into a state of outputting no drive signal to the drive electrodes other than the drive electrodes Tx17, Tx27, and Tx37 such that the drive electrodes other than the drive electrodes Tx17, Tx27, and Tx37 have potential equal to 0 [V].

(Period from Time t17 to Time t18):

In the period from time t17 to time t18, the drive control unit 12 controls the transmitter 13 in accordance with the control signal from the control unit 11. Specifically, the drive control unit 12 controls the transmitter 13 to output a pulse signal indicated in FIG. 4 to the drive electrodes Tx18, Tx28, and Tx38 via the drive lines G1*gr* to G3*gr*. As indicated in FIG. 4, the transmitter 13 outputs, in the period from time t17 to time t18, to the drive electrodes Tx18, Tx28, and Tx38 via the drive lines G2*gr* to G3*gr*, the drive signal Tx8 as a pulse signal having a signal value (voltage value) alternately changing between +Vt (Vt>0, e.g. Vt=5 [V]) and −Vt.

In the period from time t17 to time t18, the receiver 14 does not apply bias voltage to the sense electrodes such that all the sense electrodes Rx11 Rx38 have potential equal to 0 [V].

The receiver 14 is alternatively configured (1) to apply bias voltage to the sense electrodes Rx18, Rx28, and Rx38 via the sense lines such that these sense electrodes have potential Vr (Vr≥0, e.g. Vr=1.65 [V]), and (2) to apply bias voltage to the sense electrodes other than the sense electrodes Rx18, Rx28, and Rx38 via the sense lines such that these sense electrodes have potential −Vr (Vr≥0, e.g. Vr=1.65 [V]), in the period from time t17 to time t18.

Such control repetitively brings the touch panel-equipped display device 1000, while the drive electrodes Tx18, Tx28, and Tx38 are driven, into a state where (1) the drive electrodes are higher in potential than the sense electrodes and have positive potential +Vt (e.g. 5 [V]) and a state where (2) the drive electrodes are lower in potential than the sense electrodes and have negative potential −Vt (e.g. −5 [V]).

Specifically, in the state where (1) the drive electrodes are higher in potential than the sense electrodes and have positive potential +Vt (e.g. 5 [V]), electrons contained in the glue on the sense electrode layer L_Rx are attracted shifted toward the drive electrodes having the positive potential (toward the sense electrodes). In the other state where (2) the drive electrodes are lower in potential than the sense electrodes and have negative potential −Vt (e.g. −5 [V]), repulsive force is applied between the elections contained in the glue on the sense electrode layer L_Rx and the drive electrodes having the negative potential, and the electrons contained in the glue on the sense electrode layer L_Rx shifted to be away from the drive electrodes having the negative potential (away from the sense electrodes).

The control described above thus causes the touch panel-equipment display device 1000 to appropriately prevent the electrons contained in the glue applied onto the sense electrode layer L_Rx from shifting unevenly in one direction (toward the sense electrodes). In the touch panel-equipped display device 1000, the sense electrodes made of ITO are thus reduced on surfaces thereof (by oxidation-reduction reaction) to appropriately prevent refractive index change of sense electrode portions.

The drive electrodes other than the drive electrodes Tx18, Tx28, and Tx38 are not driven in the period from time t17 to time t18. The transmitter 13 is thus brought into a state of outputting no drive signal to the drive electrodes other than the drive electrodes Tx18, Tx28, and Tx38 such that the drive electrodes other than the drive electrodes Tx18, Tx28, and Tx38 have potential equal to 0 [V].

(Period from Time t18 to Time t2):

In the period from time t18 to time t2, the drive control unit 12 controls not to drive all the drive electrodes Tx11 to Tx38. Specifically, the drive control unit 12 brings the transmitter 13 into a state of outputting no drive signal such that all the drive electrodes have potential equal to 0 [V].

As indicated in FIG. 4, all the sense electrodes Rx11 to Rx38 have potential equal to 0 [V] in the period from time t18 to time t2. The receiver 14 is alternatively configured to apply bias voltage to these sense electrodes via the sense lines such that all the sense electrodes Rx11 to Rx38 have potential −Vr (Vr≥0, e.g. 1.65 [V]).

The above processing causes the touch panel-equipped display device 1000 to execute N-th (N is an integer) scan processing. Subsequent (N+1)-th scan processing (in the period from time t2 to time t3 in FIG. 5) is executed similarly to the N-th scan processing. Furthermore, (N+2)-th and following processing will be executed similarly.

The touch panel-equipped display device 1000 generates an electric field between the drive electrode and the sense electrode in accordance with each of the drive signals indicated in FIG. 4. Touching the touch panel surface causes change of the electric field, and current according to the electric field change flows to the receiver 14 via the sense lines S1*gr* to S3*gr*. In other words, the receiver 14 receives a sense signal according to the electric field change. The touched position acquisition unit 15 in the touch panel-equipped display device 1000 detects change in sense signal according to electric field change cause when the touch panel surface is touched, to detect a touched position.

Information on the touched position thus detected is outputted to the display panel control unit 2 via the control unit 11. The display panel control unit 2 outputs as necessary, to the display panel drive unit 3, a control signal for display change or the like according to the touched position. The display panel drive unit 3 then controls display on the display panel LCD in accordance with the control signal from the display panel control unit 2.

As described above, in the touch panel-equipped display device 1000, drive signals are generated to prevent the electrons contained in the glue applied onto the sense electrode layer L_Rx from shifting unevenly in one direction (toward the sense electrodes), and the touch panel TP is driven in accordance with the generated drive signals. In the touch panel-equipped display device 1000, the sense electrodes made of ITO are thus reduced on surfaces thereof (by oxidation-reduction reaction) to appropriately prevent refractive index change of sense electrode portions and appropriately prevent discoloration of the semi in-cell touch panel.

First Modification Example

Described next is the first modification example of the first embodiment.

The following description will refer to unique features of the present modification example, without referring in detail to features similar to those of the above embodiment.

A touch panel-equipped display device according to the present modification example is configured similarly to the touch panel-equipped display device 1000 according to the first embodiment.

The touch panel TP in the touch panel-equipped display device according to the present modification example is drive controlled in accordance with drive signals and sense signals different from the drive signals and the sense signals used in the touch panel-equipped display device 1000 according to the first embodiment.

The touch panel-equipped display device according to the present modification example will be described below in terms of its behavior.

Figure 6:
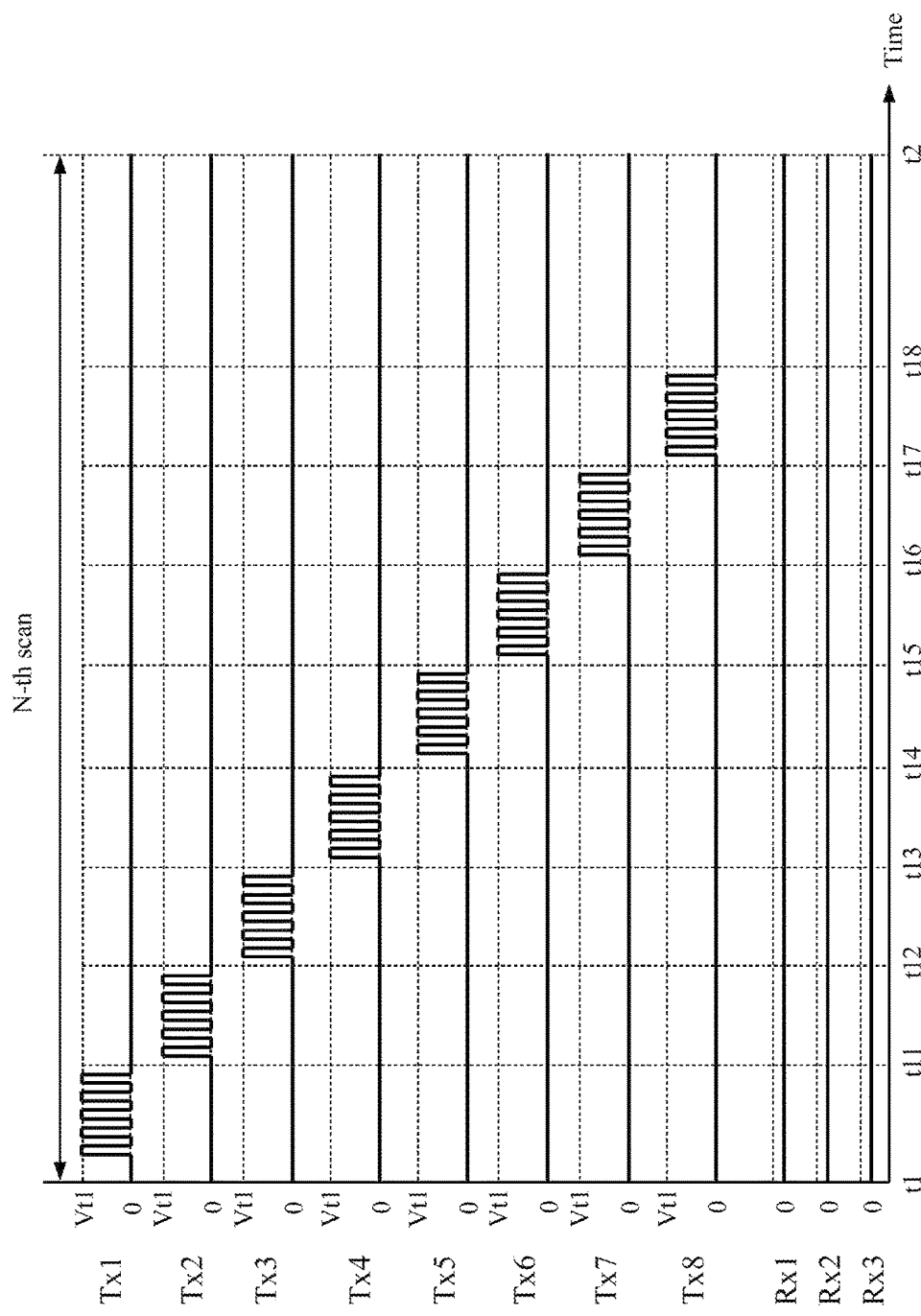
FIG. 6 is a chart indicating signal waveforms of drive signals Tx1 to Tx8 and sense signals Rx1 to Rx3 during an N-th an (N is an integer) interval (from time t1 to time t2 (a first modification example of the first embodiment).

FIG. 6 is a chart indicating signal waveforms of drive signals Tx1 to Tx8 and sense signals Rx1 to Rx3 according to the present modification example during an N-th scan (N is an integer) interval (from time t1 to time t2).

Figure 7:
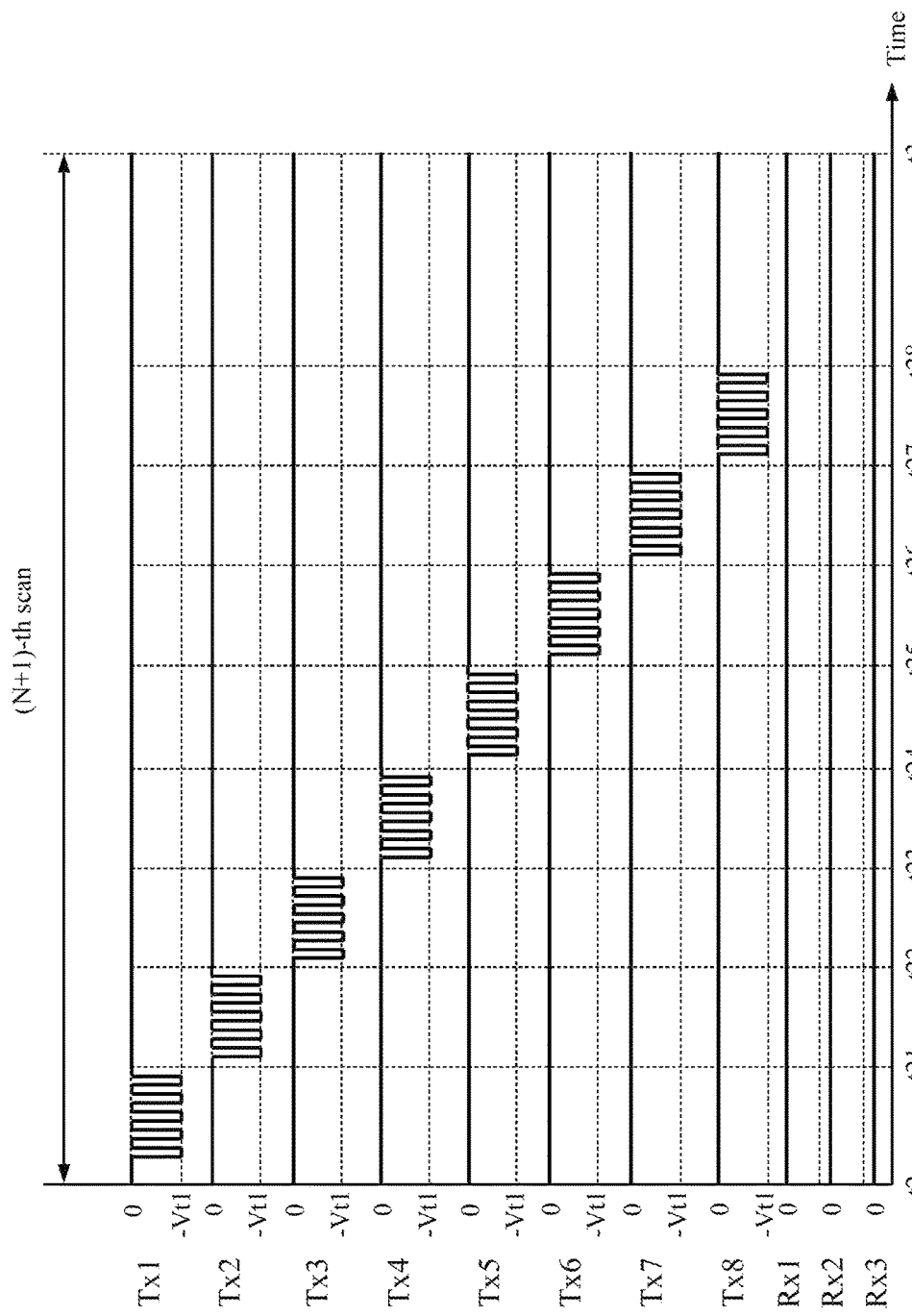
FIG. 7 is a chart indicating signal waveforms of the drive signals Tx1 to Tx8 and the sense signals Rx1 to Rx3 during an (N+1)-th scan interval (from time t2 to time t3) (the first modification example of the first embodiment).

FIG. 7 is a chart indicating signal waveforms of the drive signals Tx1 to Tx8 and the sense signals Rx1 to Rx3 during an (N+1)-th scan interval (from time t2 to time t3).

Initially described is processing in the N-th scan interval.

(Period from Time t1 to Time t11):

In the period from time t1 to time the drive control unit 12 controls the transmitter 13 in accordance with the control signal from the control unit 11. Specifically, the drive control unit 12 controls the transmitter 13 to output a pulse signal indicated in FIG. 6 via the drive lines G1*gr* to G3*gr*. As indicated in FIG. 6, the transmitter 13 outputs, in the period from time t1 to time t11, to the drive electrodes Tx11, Tx21, and Tx31 via the drive lines G1*gr* to G3*gr*, the drive signal Tx1 as a pulse signal having a signal value (voltage value) alternately changing between +Vt1 (Vt1>0, e.g. Vt1=10 [V]) and 0 [V].

In the period from time t1 to time t2, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx11, Rx21, and Rx31 via the sense lines such that these sense electrodes have potential Vr (Vr≥0, e.g. Vr=1.65 [V], and (2) not to apply bias voltage to the sense electrodes other than the sense electrodes Rx11, Rx21, and Rx31 such that these sense electrodes have potential equal to 0 [V], in the period from time t1 to time t11.

(Period from Time t11 to time t12):

In the period from time t11 to time t12, the drive control unit 12 controls the transmitter 13 in accordance with the control signal from the control unit 11. Specifically, the drive control unit 12 controls the transmitter 13 to output a pulse signal indicated in FIG. 6 via the drive lines G1*gr* to G3*gr*. As indicated in FIG. 6 the transmitter 13 outputs, in the period from time t11 to time t12, to the drive electrodes Tx12, Tx22, and Tx32 via the drive lines G1*gr* to G3*gr*, the drive signal Tx2 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx12, Rx22, and Rx32 via the sense lines such that these sense electrodes have potential Vr (Vr≥0, e.g. Vr=1.65 [V]), and (2) not to apply bias voltage to the sense electrodes other than the sense electrodes Rx12, Rx22, and Rx32 such that these sense electrodes have potential equal to 0 [V], in the period from time t11 to time t12.

(Period from Time t12 to Time t13):

In the period from time t12 to time t13, the drive control unit 12 controls the transmitter 13 in accordance with the control signal from the control unit 11. Specifically, the drive control unit 12 controls the transmitter 13 to output a pulse signal indicated in FIG. 6 via the drive lines G1*gr* to G3*gr*. As indicated in FIG. 6, the transmitter 13 outputs, in the period from time t12 to time t13, to the drive electrodes Tx13, Tx23, and Tx33 via the drive lines G1*gr* to G3*gr*, the drive signal Tx3 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx13, Rx23, and Rx33 via the sense lines such that these sense electrodes have potential Vr (Vr≥0, e.g. Vr=1.65 [V]), and (2) not to apply bias voltage to the sense electrodes other than the sense electrodes Rx13, Rx23, and Rx33 such that these sense electrodes have potential equal to 0 [V], in the period from time t12 to time t13.

(Period from Time t13 to Time t14):

In the period from time t13 to time t14, the drive control unit 12 controls the transmitter 13 in accordance with the control signal from the control unit 11. Specifically, the drive control unit 12 controls the transmitter 13 to output a pulse signal in FIG. 6 via the drive lines G1*gr* to G3*gr*. As indicated in FIG. 6, the transmitter 13 outputs, in the period from time t13 to time t14, to the drive electrodes Tx14, Tx24, and Tx34 via the drive lines G1*gr* to G3*gr*, the drive signal Tx4 as a pulse signal having a signal value (voltage value) alternately changing between +Vt1 (Vt1>0, e.g. Vt1=10 [V]) and 0 [V].

The receiver 14 is alternatively configured to apply bias voltage to the sense electrodes Rx14, Rx24, and Rx34 via the sense lines such that these sense electrodes have potential Vr (Vr≥0, e.g. Vr=1.65 [V]), and (2) not to apply bias voltage to the sense electrodes other than the sense electrodes Rx14, Rx24, and Rx34 such that these sense electrodes have potential equal to 0 [V], in the period from time t13 to time t14.

(Period from Time t14 to Time t15):

In the period from time t14 to time t15, the drive control unit 12 controls the transmitter 13 in accordance with the control signal from the control unit 11. Specifically, the drive control unit 12 controls the transmitter 13 to output a pulse signal indicated in FIG. 6 via the drive lines G1*gr* to G3*gr*. As indicated in FIG. 6, the transmitter 13 outputs, in the period from time t14 to time t15, to the drive electrodes Tx15, Tx25, and Tx35 via the drive lines G1*gr* to G3*gr*, the drive signal Tx5 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx15, Rx25, and Rx35 via the sense lines such that these sense electrodes have potential Vr (Vr≥0, e.g. Vr=1.65 [V]), and (2) not to apply bias voltage to the sense electrodes other than the sense electrodes Rx15, Rx25, and Rx35 such that these sense electrodes have potential equal to 0 [V], in the period from time t14 to time t15.

(Period from Time t15 to Time t16):

In the period from time t15 to time t16, the drive control unit 12 controls the transmitter 13 in accordance with the control signal from the control unit 11. Specifically, the drive control unit 12 controls the transmitter 13 to output a pulse signal indicated in FIG. 6 via the drive lines G1gr to G3gr. As indicated in FIG. 6, the transmitter 13 outputs, in the period from time t15 to time t16, to the drive electrodes Tx16, Tx26, and Tx36 via the drive lines G1gr to G3gr, the drive signal Tx6 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx16, Rx26, and Rx36 via the sense lines such that these sense electrodes have potential Vr (Vr≥0, e.g. Vr=1.65 [V]), and (2) not to apply bias voltage to the sense electrodes other than the sense electrodes Rx16, Rx26, and Rx36 via the sense lines such that these sense electrodes have potential equal to 0 [V], in the period from time t15 to time t16.

(Period from Time t16 to Time t17):

In the period from time t16 to time t17, the drive control unit 12 controls the transmitter 13 in accordance with the control signal from the control unit 11. Specifically, the drive control unit 12 controls the transmitter 13 to output a pulse signal indicated in FIG. 6 via the drive lines G1gr to G3gr. As indicated in FIG. 6, the transmitter 13 outputs, in the period from time t16 to time t17, to the drive electrodes Tx17, Tx27, and Tx37 via the drive lines G1gr to G3gr, the drive signal Tx7 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx17, Rx27, and Rx37 via the sense lines such that these sense electrodes have potential Vr (Vr≥0, e.g. Vr=1.65 [V]), and (2) not to apply bias voltage to the sense electrodes other than the sense electrodes Rx17, Rx27, and Rx37 such that these sense electrodes have potential equal to 0 [V], in the period from time t16 to time t17.

(Period from Time t17 to Time t18):

In the period from time t17 to time t18, the drive control unit 12 controls the transmitter 13 in accordance with the control signal from the control unit 11. Specifically, the drive control unit 12 controls the transmitter 13 to output a pulse signal indicated in FIG. 6 via the drive lines G1gr to G3gr. As indicated in FIG. 6, the transmitter 13 outputs, in the period from time t17 to time t18, to the drive electrodes Tx18, Tx28, and Tx38 via the drive lines G1gr to G3gr, the drive signal Tx8 as a pulse signal having a signal value (voltage value) alternatively changing between +Vt1 (Vt1>0, e.g. Vt1=10 [V]) and 0 [V].

The receiver 14 is alternatively configured (1) to apply bias voltage to the sense electrodes Rx18, Rx28, and Rx38 via the sense lines such that these sense electrodes have potential Vr (Vr≥0, e.g. Vr=1.65 [V]), and (2) not to apply bias voltage to the sense electrodes other than the sense electrodes Rx18, Rx28, and Rx38 such that these sense electrodes have potential equal to 0 [V], in the period from time t17 to time t18.

(Period from Time t18 to Time t2):

In the period from time t18 to time t2, the drive control unit 12 controls not to drive all the drive electrodes Tx11 to Tx38. Specifically, the drive control unit 12 brings the transmitter 13 into a state of outputting no drive signal such that all the drive electrodes have potential equal to 0 [V].

In the period from time t18 to time t2, bias voltage is not applied to the sense electrodes such that all the sense electrodes Rx11 to Rx38 have potential equal to 0 [V] as indicated in FIG. 6.

Described next is processing in the (N+1)-th scan interval.

(Period from Time t2 to Time t21):

In the period from time t2 to time t21, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t2 to time t21, to the drive electrodes Tx11, Tx21, and Tx31 via the drive lines G1gr to G3gr, the drive signal Tx1 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx11, Rx21, and Rx31 via the sense lines such that these sense electrodes have potential −Vr (Vr≥0, e.g. Vr=1.65 [V]), and (2) to apply bias voltage to the sense electrodes other than the sense electrodes Rx11, Rx21, and Rx31 via the sense lines such that these sense electrodes have potential equal to 0 [V], in the period from time t2 to time t21.

(Period from Time t21 to Time t22)

In the period from time t21 to time t22, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t21 to time t22, to the drive electrodes Tx12, Tx22, and Tx32 via the drive lines G1gr to G3gr, the drive signal Tx2 as a pulse signal having a signal value (voltage value) alternately changing between −Vt1 (Vt1>0, Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx12, Rx22, and Rx32 via the sense lines such that these sense electrodes have potential −Vr (Vr≥0, e.g. Vr=1.65 [V]), and (2) to apply bias voltage to the sense electrodes other than the sense electrodes Rx12, Rx22, and Rx32 via the sense lines such that these sense electrodes have potential equal to 0 [V], in the period from time t21 to time t22.

(Period from Time t22 to Time t23):

In the period from time t21 to time t23, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t22 to time t23, to the drive electrodes Tx13, Tx23, and Tx33 via the drive lines G1gr to G3gr, the drive signal Tx2 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx13, Rx23, and Rx33 via the sense lines such that these sense electrodes have potential −Vr (Vr≥0, e.g. Vr=1.65 [V], and (2) to apply bias voltage to the sense electrodes other than the sense electrodes Rx13, Rx23, and Rx33 via the sense lines such that these sense electrodes have potential equal to 0 [V], in the period from time t22 to time t23.

(Period from Time t23 to Time t24):

In the period from time t23 to time t24, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t23 to time t24, to the drive electrodes Tx14, Tx24, and Tx34 via the drive lines G1gr to G3gr, the drive signal Tx4 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx14, Rx24, and Rx34 via the sense lines such that these sense electrodes have potential −Vr (Vr≥0, e.g. Vr=1.65 [V]), and (2) to apply bias voltage to the sense electrodes other than the sense electrodes Rx14, Rx24, and Rx34 via the sense lines such that these sense electrodes have potential equal to 0 [V], in the period from time t23 to time t24.

(Period from Time t24 to Time t25):

In the period from time t24 to time t25, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t24 to time t25, to the drive electrodes Tx15, Tx25 and Tx35 via the drive lines G1gr to G3gr, the drive signal Tx5 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx15, Rx25, and Rx35 via the sense lines such that these sense electrodes have potential −Vr (Vr≥0, e.g. Vr=1.65 [V], and (2) to apply bias voltage to the sense electrodes other than the sense electrodes Rx15, Rx25, and Rx35 via the sense lines such that these sense electrodes have potential equal to 0 [V], in the period from time t24 to time t25.

(Period from Time t25 to Time t26):

In the period from time t25 to time t26, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t25 to time t26, to the drive electrodes Tx16, Tx26, and Tx36 via the drive lines G1gr to G3gr, the drive signal Tx6 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx16, Rx26, and Rx36 via the sense lines such that these sense electrodes have potential −Vr (Vr≥0, e.g. Vr=1.65 [V]), and (2) to apply bias voltage to the sense electrodes other than the sense electrodes Rx16, Rx26, and Rx36 via the sense lines such that these sense electrodes have potential equal to 0 [V], in the period from time t25 to time t26.

(Period from Time t26 to Time t27):

In the period from time t26 to time t27, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t26 to time t27, to the drive electrodes Tx17, Tx27, and Tx37 via the drive lines G1gr to G3gr, the drive signal Tx7 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx17, Rx27, and Rx37 via the sense lines such that these sense electrodes have potential −Vr (Vr≥0, e.g. Vr=1.65 [V]), and (2) to apply bias voltage to the sense electrodes other than the sense electrodes Rx17, Rx27, and Rx37 via the sense lines such that these sense electrodes have potential equal to 0 [V], in the period from time t26 to time t27.

(Period from Time t27 to Time t28):

In the period from time t27 to time t28, the drive control unit 12 controls the transmitter 13 in accordance with the control signal from the control unit 11. Specifically, the drive control unit 12 controls the transmitter 13 to output a pulse signal indicated in FIG. 7 via the drive lines G1gr to G3gr. As indicated in FIG. 7, the transmitter 13 outputs, in the period from time t27 to time t28, to the drive electrodes Tx18, Tx28, and Tx28 via the drive lines G1gr to G3gr, the drive signal Tx8 as a pulse signal having a signal value (voltage value) alternately changing between −Vt1 (Vt1>0, e.g. Vt1=10 [V]) and 0 [V].

In the period from time t2 to time t3, the receiver 14 does not apply bias voltage to the sense electrodes such that all the sense electrodes Rx11 to Rx38 have potential equal to 0 [V].

The receiver 14 is alternatively configured (1) to apply bias voltage to the sense electrodes Rx18, Rx28, and Rx38 via the sense lines such that these sense electrodes have potential −Vr (Vr≥0, e.g. Vr=1.65 [V]), and (2) to apply bias voltage to the sense electrodes other than the sense electrodes Rx18, Rx28, and Rx38 via the sense lines such that these sense electrodes have potential equal to 0 [V], in the period from time t27 to time t28.

(Period from Time t36 to Time t3):

In the period from time t28 to time t3, the drive control unit 12 controls not to drive all the drive electrodes Tx11 to Tx38. Specifically, the drive control unit 12 brings the transmitter 13 into a state of outputting no drive signal such that all the drive electrodes have potential equal to 0 [V].

In the period from time t28 to time t3, bias voltage is not applied to the sense electrodes such that all the sense electrodes Rx11 to Rx38 have potential equal to 0 [V] as indicated in FIG. 7.

The (N+1)-th scan processing is executed as described above. The touch panel-equipped display device according to the present modification example then repeats processing similar to the N-th scan processing and processing similar to the (N+1)-th scan processing.

As described above, the touch panel-equipped display device according to the present modification example is configured to generate drive signals such that an integrated value of a potential difference between a drive electrode and a sense electrode an electric field generated between the drive electrode and the sense electrode) is substantially be zero (less than a predetermined value) during two scan processing periods of the touch panel TP (e.g. the period from time t1 to time t3 in FIGS. 6 and 7). In other words, in the touch panel-equipped display device according to the present modification example, the drive signals are generated to prevent the electrons contained in the glue applied onto the sense electrode layer from shifting unevenly in one direction (toward the sense electrodes) during two scan processing periods of the touch panel TP (e.g. the period from time t1 to time t3 in FIGS. 6 and 7), and the touch panel TP is driven in accordance with the generated drive signals. In the touch panel-equipped display device according to the present modification example, the sense electrodes made of ITO are thus reduced on surfaces thereof (by oxidation-reduction reaction) to appropriately prevent refractive index change of sense electrode portions and appropriately prevent discoloration of the semi in-cell touch panel.

Second Modification Example

Described next is the second modification example of the first embodiment.

The following description will refer to unique features of the present modification example, without referring in detail to features similar to those of the above embodiment.

A touch panel-equipped display device according to the present modification example is configured similarly to the touch panel-equipped display device 1000 according to the first embodiment.

The touch panel TP in the touch panel-equipped display device according to the present modification example is drive controlled in accordance with drive signals and sense signals different from the drive signals and the sense signals used in the touch panel-equipped display device 1000 according to the first embodiment.

The touch panel-equipped display device according to the present modification example will be described below in terms of its behavior.

Figure 8:
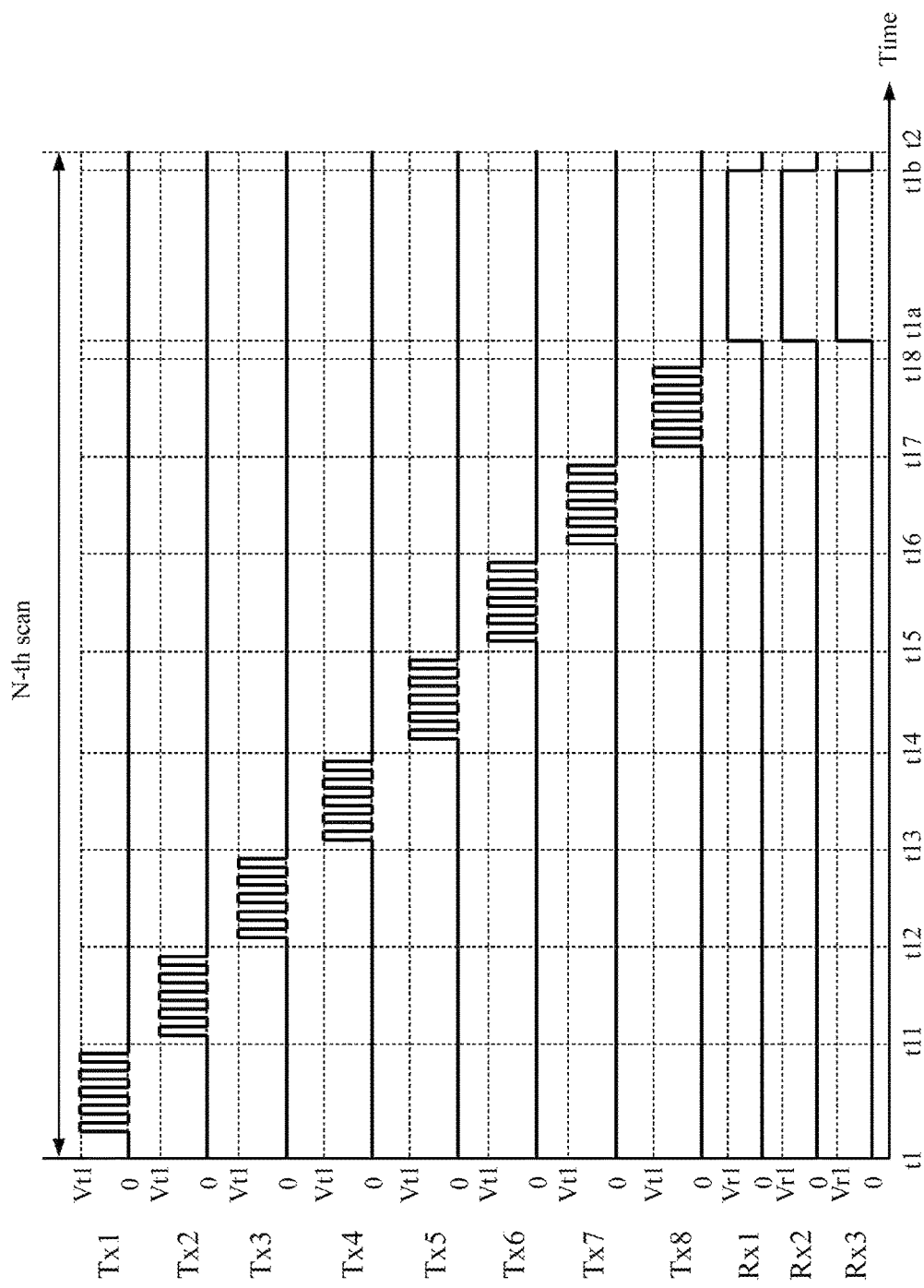
FIG. 8 is a chart indicating signal waveforms of a drive signal Tx1 and a sense signal Rx1 during an N-th scan (N is an integer) interval (from time t1 to time t2) (a second modification example of the first embodiment).

FIG. 8 is a chart indicating signal waveforms of a drive signal Tx1 and a sense signal Rx1 according to the present modification example during an N-th scan (N is an integer) interval (from time t1 to time t2).

Figure 9:
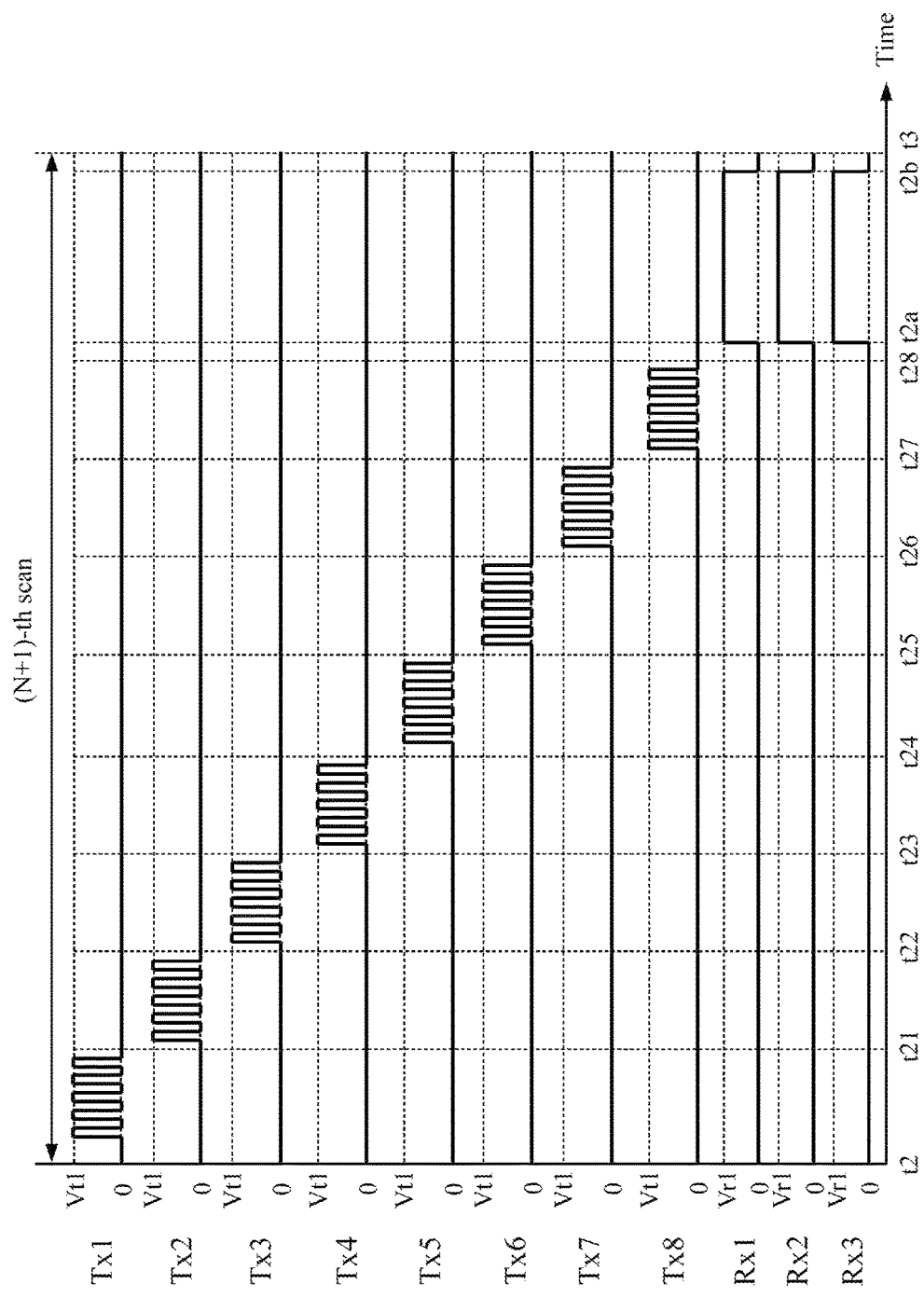
FIG. 9 is a chart indicating signal waveforms of drive signals Tx1 to Tx8 and sense signals Rx1 to Rx3 during an (N+1)-th scan interval (from time t2 to time t3 (the second modification example of the first embodiment).

FIG. 9 is a chart indicating signal waveforms of drive signals Tx1 to Tx8 and sense signals Rx1 to Rx3 during an (N+1)-th scan interval (from time t2 to time t3).

(Period from Time t1 to Time t11);

In the period from time t1 to time t11, the drive control unit 12 controls the transmitter 13 in accordance with the control signal from the control unit 11. Specifically, the drive control unit 12 controls the transmitter 13 to output a pulse signal indicated in FIG. 8 via the drive lines G1gr to G3gr. As indicated in FIG. 8, the transmitter 13 outputs, in the period from time t1 to time t11, to the drive electrodes Tx11, Tx21, and Tx31 via the drive lines G1gr to G3gr, the drive signal Tx1 as a pulse signal baying a signal value (voltage value) alternately changing between +Vt1 (Vt1>0, e.g. Vt1=10 [V] and 0 [V].

In the period from time t1 to time t2, the receiver 14 does no apply bias voltage to the sense electrodes such that all the sense electrodes Rx11 to Rx38 have potential equal to 0 [V].

The receiver 14 is alternatively configured (1) to apply bias voltage to the sense electrodes Rx11, Rx21, and Rx31 via the sense lines such that these sense electrodes have potential Vr (Vr≥0, e.g. Vr=1.65 [V], and (2) not to apply bias voltage to the sense electrodes other than the sense electrodes Rx11, Rx21, and Rx31 such that these sense electrodes have potential equal to 0 [V], in the period from time t1 to time t11.

(Period from Time t11 to Time t12):

In the period from time t11 to time t12, the drive control unit 12 controls the transmitter 13 in accordance with the control signal from the control unit 11. Specifically, the drive control unit 12 controls the transmitter 13 to output a pulse signal indicated in FIG. 8 via the drive lines G1gr to G3gr. As indicated in FIG. 8, the transmitter 13 outputs, in the period from time t11 to time t12, to the drive electrodes Tx12, Tx22, and Tx32 via the drive lines G1gr to G3gr, the drive signal Tx2 as a pulse signal having a signal value (voltage value) alternately changing between +Vt1 (Vr1>0, Vt1=10 [V]) and 0 [V].

The receiver 14 is alternatively configured (1) to apply bias voltage to the sense electrodes Rx12, Rx22, and Rx32 via the sense lines such that these sense electrodes have potential Vr (Vr≥0, e.g. Vr=1.65 [V]), and (2) not to apply bias voltage to the sense electrodes other than the sense electrodes Rx12, Rx22, and Rx32 such that these sense electrodes have potential equal to 0 [V], in the period from time t11 to time t12.

(Period from Time t12 to Time t13):

In the period from time t12 to time t13, the drive control unit 12 controls the transmitter 13 in accordance with the control signal from the control unit. Specifically, the drive control unit 12 controls the transmitter 13 to output a pulse signal indicated in FIG. 8 in the drive lines G1gr to G3gr. As indicated in FIG. 8, the transmitter 13 outputs, in the period from time t12 to time t13, to the drive electrodes Tx13, Tx23, and Tx33 via the drive lines G1gr to G3gr, the drive signal Tx3 as a pulse signal having a signal value (voltage value) alternately changing between +Vt1 (Vt1>0, e.g. Vt1=10 [V] and 0 [V].

The receiver 14 is alternatively configured (1) to apply bias voltage to the sense electrodes Rx13, Rx23, and Rx33 via the sense lines such that these sense electrodes have potential Vr (Vr≥0, e.g. Vr=1.65 [V], and (2) not to apply bias voltage to the sense electrodes other than the sense electrodes Rx13, Rx23, and Rx33 such that these sense electrodes have potential equal to 0 [V], in the period from time t2 to time t13.

(Period from Time t13 to Time t14):

In the period from time t13 to time t14, the drive control unit 12 controls the transmitter 13 in accordance with the control signal from the control unit 11. Specifically, the drive control unit 12 controls the transmitter 13 to output a pulse signal indicated in FIG. 8 via the drive lines G1*gr* to G3*gr*. As indicated in FIG. 8, the transmitter 13 outputs, in the period from time t13 to time t14, to the drive electrodes Tx14, Tx24, and Tx34 via the drive lines G1*gr* to G3*gr*, the drive signal Tx4 as a pulse signal having a signal value (voltage value) alternately changing between +Vt1 (Vt1>0, e.g. Vt1=10 [V] and 0 [V].

The receiver 14 is alternatively configured (1) to apply bias voltage to the sense electrodes Rx14, Rx24, and Rx34 via the sense lines such that these sense electrodes have potential Vr (Vr≥0, e.g. Vr=1.65 [V]), and (2) not to apply bias voltage to the sense electrodes other than the sense electrodes Rx14, Rx24, and Rx34 such that these sense electrodes have potential equal to 0 [V], in the period from time t13 to time t14.

(Period from Time t14 to Time t15):

In the period from time t14 to time t15, the drive control unit 12 controls the transmitter 13 in accordance with the control signal from the control unit 11. Specifically, the drive control unit 12 controls the transmitter 13 to output a pulse signal indicated in FIG. 8 via the drive lines G1*gr* to G3*gr*. As indicated in FIG. 8, the transmitter 13 outputs, in the period from time t14 to time t15, to the drive electrodes Tx15, Tx25, and Tx35 via the drive lines G1*gr* to G3*gr*, the drive signal Tx5 as a pulse signal having a signal value (voltage value) alternately changing between +Vt1 (Vt1>0, [V]) and 0 [V].

The receiver 14 is alternatively configured (1) to apply bias wimp to the sense electrodes Rx15, Rx25, and Rx35 via the sense lines such that these sense electrodes has potential Vr (Vr≥0, e.g. Vr=1.65 and (2) not to apply bias voltage to the sense electrodes other than the sense electrodes Rx15, Rx25, and Rx35 such that these sense electrodes have potential equal to 0 [V], in the period from time t14 to time t15.

(Period from Time t15 to Time t16):

In the period from time t15 to time t16, the drive control unit 12 controls the transmitter 13 in accordance with the control signal from the control unit 11. Specifically, the drive control unit 12 controls the transmitter 13 to output a pulse signal indicated in FIG. 8 via the drive lines G1*gr* to G3*gr*. As indicated in FIG. 8, the transmitter 13 outputs, in the period from time t15 to time t16, to the drive electrodes Tx16, Tx26, and Tx36 via the drive lines G1*gr* to G3*gr*, the drive signal Tx6 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx16, Rx26, and Rx36 is the sense lines such that these sense electrodes have potential Vr (Vr≥0, e.g., Vr=1.65 [V]), and (2) not to apply bias voltage to the sense electrodes other than the sense electrodes Rx16, Rx26, and Rx36 via the sense lines such that these sense electrodes have potential equal to 0 [V], in the period from time t15 to time t16.

(Period from Time t16 to Time t17):

In the period time t16 to time t17, the drive control unit 12 controls the transmitter 13 in accordance with the control signal from the control unit 11. Specifically, the drive control unit 12 controls the transmitter 13 to output a pulse signal indicated in FIG. 8 via the drive lines G1*gr* to G3*gr*. As indicated in FIG. 8, the transmitter 13 outputs in the period from time t16 to time t17, to the drive electrodes Tx17, Tx27, and Tx37 via the drive lines G1*gr* to G3*gr*, the drive signal Tx7 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx17, Rx27, and Rx37 via the sense lines such that these sense electrodes have potential Vr (Vr≥0, e.g. Vr=1.65 [Vr]), and (2) not to apply bias voltage to the sense electrodes other than the sense electrodes Rx17, Rx27, and Rx37 such that these sense electrodes have potential equal to 0 [V], in the period from time t16 to time t17.

(Period from Time t17 to Time t18):

In the period from time t17 to time t18, the drive control unit 12 controls the transmitter 13 in accordance with the control signal from the control unit 11. Specifically, the drive control unit 12 controls the transmitter 13 to output a pulse signal indicated in FIG. 8 via the drive lines G1*gr* to G3*gr*. As indicated in FIG. 8, the transmitter 13 outputs, in the period from time t17 to time t18, to the drive electrodes Tx18, Tx28, and Tx38 via the drive lines G1*gr* to G3*gr*, the drive signal Tx8 as a pulse signal having a signal value (voltage value) alternately changing between +Vt1 (Vt1>0, e.g. Vt1=10 [V]) and 0 [V].

The receiver 14 is alternatively configured (1) to apply bias voltage to the sense electrodes Rx18, Rx28, and Rx38 via the sense lines such that these sense electrodes have potential Vr (Vr≥0, e.g. Vr=1.65 [V]), and (2) not to apply bias voltage to the sense electrodes other than the sense electrodes Rx18, Rx28, and Rx38 such that these sense electrodes have potential equal to 0 [V], in the period from time t17 to time t18.

(Period from Time t18 to Time t1*a*):

In the period from time t18 to time t1*a*, the drive control unit 12 controls not to drive all the drive electrodes Tx11 to Tx38. Specifically, the drive control unit 12 brings the transmitter 13 into a state of outputting no drive signal such that all the drive electrodes have potential equal to 0 [V].

In the period from time t18 to time t1*a* bias voltage is not applied to the sense electrodes such that all the sense electrodes Rx11 to Rx38 have potential equal to 0 [V] as indicated in FIG. 8.

The period from time t18 to time t1*a* can be set appropriately, and may not be provided (the period from time t18 to time t1*a* can be set to 0 [s]).

(Period from Time t1*a* to Time t1*b*)

In the period from time t1*a* to time t1*b* the drive control unit 12 controls not to drive all the drive electrodes Tx11 to Tx38. Specifically, the drive control unit 12 brings the transmitter 13 into a state of outputting no drive signal such that all the drive electrodes have potential equal to 0 [V].

In the period from time t1*a* to time t1*b*, bias voltage is applied to the sense lines S1*gr* such that all the sense electrodes Rx11 to Rx38 have potential Vr1 (Vr1>0, e.g. Vr1=10 [V]) as indicated in FIG. 8.

(Period from Time t1*b* to Time t2):

In the period from time t1*b* to time t2, the drive control unit 12 controls not to drive all the drive electrodes Tx11 to Tx38. Specifically, the drive control unit 12 brings the transmitter 13 into a state of outputting no drive signal such that all the drive electrodes have potential equal to 0 [V].

In the period from time t1*b* to time t2, bias voltage is not applied to the sense electrodes such that all the sense electrodes Rx11 to Rx38 have potential equal to 0 [V] as indicated in FIG. 8.

The above processing causes the touch panel-equipped display device according to the present modification example to execute the N-th (N is an integer) scan processing. The subsequent (N+1)-th scan processing (in the period from time t2 to time t3 in FIG. 9) is executed similarly to the N-th scan processing. Furthermore, (N+2)-th and following processing will be executed similarly.

As described above, the touch panel-equipped display device according to the present modification example executes touch panel drive control as described above in a single scan processing period of the touch panel TP (e.g. the period from time t1 to time t2 in FIG. 8), so that (1) the drive electrodes are mostly higher in potential than the sense electrodes while the drive electrodes are driven (e.g. the period from time t1 to time t18 in FIG. 8), and (2) the drive electrodes are mostly lower in potential than the sense electrodes while the drive electrodes are not driven (e.g. the period from time t18 to time t2 in FIG. 8).

In other words, in the touch panel-equipped display device according to the present modification example, drive signals are generated to prevent the electrons contained in the glue applied onto the sense electrode layer L_Rx from shifting unevenly in one direction (toward the sense electrodes) during a single scan processing period of the touch panel TP (e.g. the period from time t1 to time t2 in FIG. 8), and touch panel drive control is executed in accordance with the generated drive signals. In the touch panel-equipped display device according to the present modification example, the sense electrodes made of ITO are thus reduced on surfaces thereof (by oxidation-reduction reaction) to appropriately prevent refractive index change of sense electrode portions and appropriately prevent discoloration of the semi in-cell touch panel.

Other Embodiments

Figure 10:
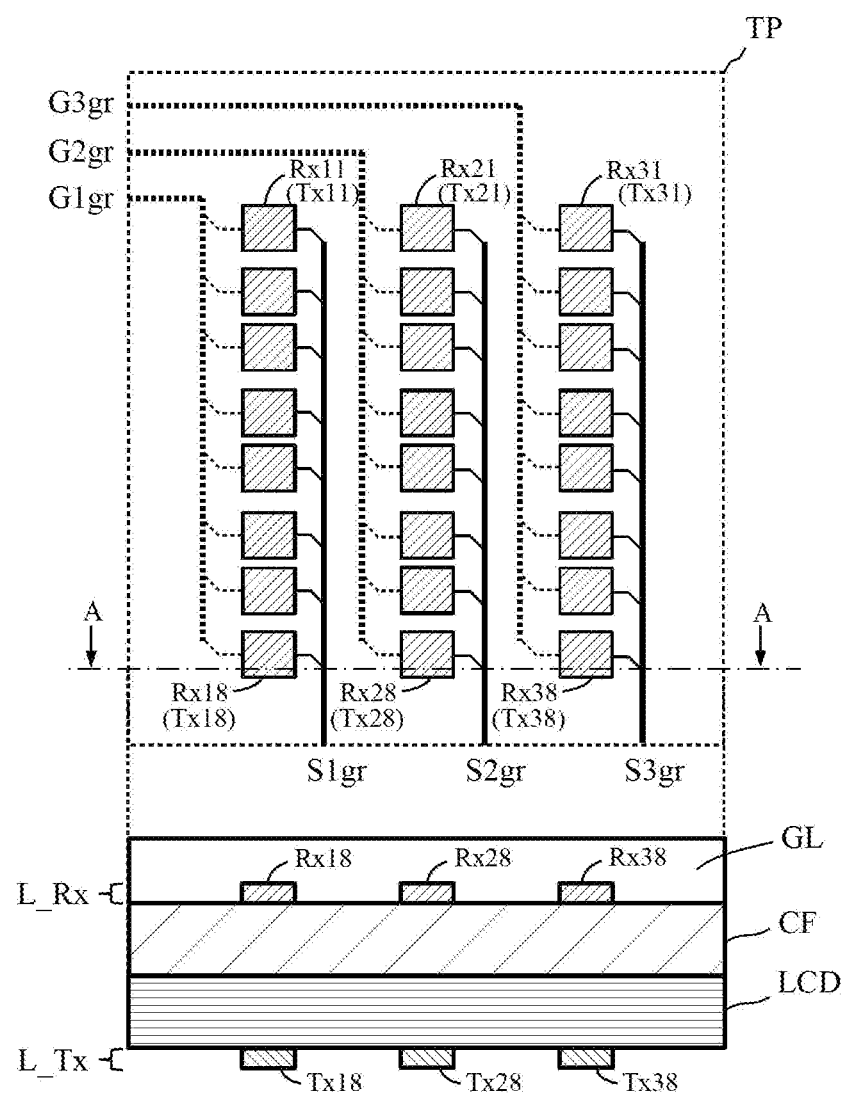
FIG. 10 depicts a summary plan view of a touch panel TP of a touch panel-equipped display device according to another embodiment (in an upper portion), and a summary sectional view taken along line A-A.
Figure 11:
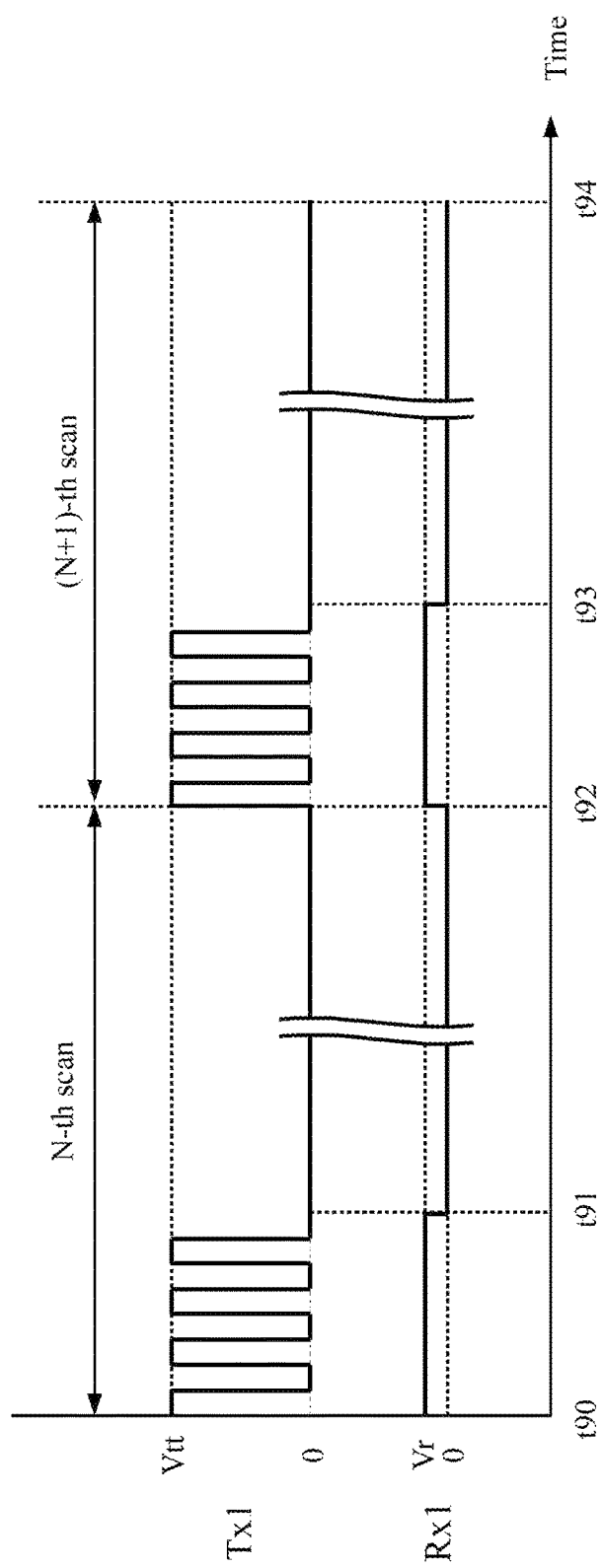
FIG. 11 is a chart indicating (exemplary) signal waveforms of a drive signal Tx1 and a sense signal Rx1.
Figure 12:
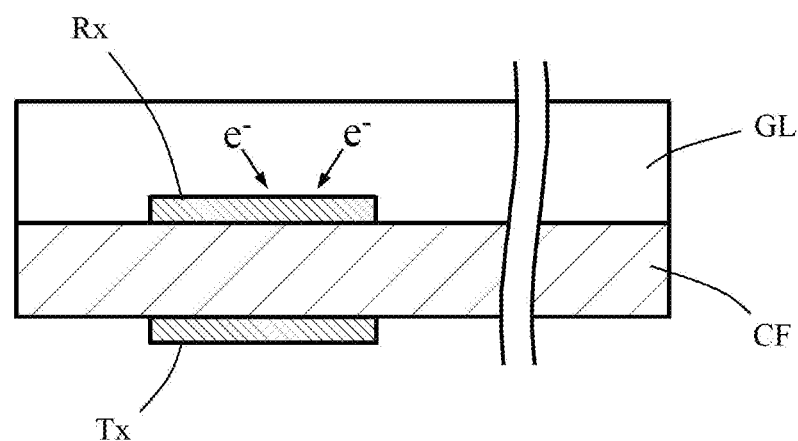
FIG. 12 is a summary sectional view depicting part of a display device including a semi in-cell touch panel.

The above embodiment (including the modification examples) exemplifies the case where the drive electrode layer L_Tx provided between the color filter layer CF and the display panel LCD as depicted in FIG. 2. The present invention is not limited to this case. As exemplarily depicted in FIG. 10, the touch panel TP can alternatively be configured such that the display panel LCD is disposed below the color filter layer CF and the drive electrode layer L_Tx is disposed below the display panel LCD.

Furthermore, the embodiment and the modification examples described above can be combined partially or entirely to achieve a touch panel-equipped display device or a touch panel device.

The above embodiment (including the modification examples) refers to the touch panel TP in the touch panel-equipped display device including the drive electrodes and the sense electrodes depicted in FIG. 1. The present invention is not limited to this case. In the touch panel TP of the touch panel-equipped display device, the drive electrodes and the sense electrodes can alternatively be configured differently in terms of their disposition, numbers, shapes, and the like. Moreover, the drive lines and the sense lines are not limited to the above embodiment (including the modification examples) in terms of their disposition and the like in the touch panel TP of the touch panel-equipped display device.

The above embodiment (including the modification examples) exemplifies the case where drive signals are generated and outputted to sequentially drive the drive electrodes in the touch panel-equipped display device. The present invention is not limited to this case, and the drive signals can alternatively be generated and outputted to simultaneously drive the drive electrodes.

For example, the touch panel-equipped display device can output the drive signals Tx2 to Tx8 simultaneously with the drive signal Tx1. In other words, the touch panel-equipped display device can output the drive signals Tx1 to Tx8 having pulse waveform portions within the period from time t1 to time t11.

The touch panel-equipped display device or the touch panel device according to the above embodiment can partially or entirely be embodied as an integrated circuit (e.g. an LSI or a system LSD.

The processing in each functional block according to the above embodiment can partially or entirely be executed in accordance with a program. The processing in each functional block according to the above embodiment can partially or entirely be executed by a central processing unit (CPU) included in a computer. The program for execution of each processing can be stored in a storage device such as a hard disk or a ROM to allow the central processing unit (CPU) to read the program from the ROM or a RAM and execute the program.

Each processing according to the above embodiment can be executed by hardware or software (including execution with use of an operating system (OS), middleware, or a predetermined library). The processing can still alternatively be executed mixedly by software and hardware. The processing can still alternatively be executed mixedly by software and hardware. In the case where the touch panel-equipped display device or the touch panel device according to the above embodiment is embodied by hardware, it is obviously necessary to adjust timing for execution of each processing. The above embodiment does not refer to details of timing adjustment for various signals to be executed in actual hardware design, for convenience.

The processing method according to the above embodiment is not necessarily limited, in terms of its execution orders, to that described in the above embodiment, but can be executed in different execution orders within the scope not departing from the purpose of the invention.

A computer program causing a computer to execute the above method and a computer-readable recording medium storing the program are included, in the scope of the present invention. Examples of the computer-readable recording medium include a flexible disk, a hard disk, a CD-ROM, an MO, a DVD, a large capacity DVD, a next-generation DVD, and a semiconductor memory.

The computer program is not limitedly recorded in the recording medium, but can alternatively be transmitted via a telecommunication line, a wireless or wired communication line, a network such as the Internet, or the like.

The above embodiment may refer to only major elements necessary for the above embodiment in a simplified manner out of the constituent elements according to the above embodiment. The present invention can than include appropriate constituent elements that are not clearly mentioned in the above embodiment. The members in the above embodiment and the drawings may not accurately be described or depicted with actual dimensions, in actual dimensional ratios, or the like.

The present invention is not limited to these embodiments in terms of its specific configurations, but the configurations can be modified and revised in various manners within the scope not departing from the purpose of the invention.

<Supplementary Note>

The present invention can alternatively be recited as follows.

A first aspect of the invention relates to a touch and device including a color filter glass layer to be provided with a color filter, a touch panel, and a touch panel control unit.

The touch panel includes (1) a touch panel first layer provided on the color filter glass layer and including a sense electrode made of a transparent conductive film, and (2) a touch panel second layer including a drive electrode.

The touch panel control unit generates a drive signal such that an integrated value of a potential difference between the drive electrode and the sense electrode (an electric field generated between the time electrode and the sense electrode) is less than a predetermined value (e.g. substantially zero) in a predetermined period of driving the touch panel.

In the touch panel device, the drive signal is generated to prevent electrons contained in glue applied onto the touch panel first layer (sense electrode layer) from shifting unevenly in one direction (toward the sense electrode) and the touch panel is driven in accordance with the generated drive signal. In the touch panel device, the sense electrode made of the transparent conductive film (e.g. ITO) is thus reduced on a surface thereof (by oxidation-reduction reaction) to appropriately prevent refractive index change of a sense electrode portion. The touch panel device appropriately prevents discoloration of a semi in-cell touch panel.

The "predetermined value" for determination of a magnitude correlation with the integrated value of the potential difference between the drive electrode and the sense electrode (the electric field generated between the drive electrode and the sense electrode) in the predetermined period is preferably set in consideration of a inhibition reference for unevenness of weak current flowing from the drive electrode to the sense electrode in the predetermined period, to achieve prevention of discoloration of the touch panel. The "predetermined value" can alternatively be set in accordance with light transmittance of the touch panel.

The "transparent conductive film" conceptually indicates a film having at least certain light transmittance and at least certain conductivity, and examples thereof include a conductive film made of ITO. The expression "transparent" conceptually includes being "colorless and transparent".

According to a second aspect of the invention, the drive electrode in the touch panel second layer in the first aspect of the invention is provided as a mesh pattern electrode made of thin metallic wires or an electrode made of indium tin oxide (ITO).

The touch panel second layer can thus be embodied as a metal layer. The drive electrode in the touch panel second layer, which is provided as the mesh pattern electrode made of thin metallic wires, securely achieves light transmittance having at least a predetermined value.

The touch panel second layer can thus be embodied as a layer made of indium tin oxide (ITO) an (ITO layer). The drive electrode in the touch panel second layer, which is provided as the electrode made of ITO, securely achieves light transmittance not less than a predetermined value.

According to a third aspect of the invention, the touch panel second layer in the first or second aspect of the invention opposes the touch panel first layer with the color filter glass layer interposed therebetween.

In the touch panel device, the color filter glass layer can thus be provided on respective sides with the sense electrode layer and the drive electrode layer.

According to a fourth aspect of the invention, the touch panel control unit in any one of the first to third aspects of the invention generates the drive signal such that a period of driving the drive electrode includes a first period with positive signal voltage and a second period with negative signal voltage.

The touch panel device can thus appropriately prevent generation of an electric field between the drive electrode and the sense electrode unevenly in one direction while the drive electrode is driven. The touch panel device is configured to generate the drive signal as described above to prevent the electrons contained in the glue applied onto the touch panel first layer (sense electrode layer) provided with the sense electrode from shilling unevenly in one direction (toward the sense electrode). In the touch panel device, the sense electrode made of the transparent conductive film (e.g. OD) is thus reduced on a surface thereof (by oxidation-reduction reaction) to appropriately prevent refractive index change of the sense electrode portion and appropriately prevent discoloration of the touch panel (e.g. a semi in-cell touch panel).

According to a fifth aspect of the invention, the touch panel control unit according to any one of the first to third aspects of the invention generates the drive signal such that (1) the period of driving the drive electrode in a period T1 of scanning the touch panel once includes a third period with positive signal voltage and a fourth period with signal voltage having an absolute value not more than a first threshold, and (2) the period of driving the drive electrode in a period T2, subsequent to the period T1, of scanning the touch panel once includes a fifth period with negative signal voltage and a sixth period with signal voltage having an absolute value not more than a second threshold.

The touch panel device can thus appropriately prevent generation of an electric field between the drive electrode and the sense electrode unevenly in one direction while the touch panel is scanned twice. The touch panel device is configured to generate the drive signal as described above to prevent the electrons contained in the glue applied onto the touch panel first layer (sense electrode layer) provided with the sense electrode from shifting unevenly in one direction (toward the sense electrode). In the touch panel device, the sense electrode made of the transparent conductive film (e.g. ITO) is thus reduced on a surface thereof (by oxidation-reduction reaction) to appropriately prevent refractive index change of the sense electrode portion and appropriately prevent discoloration of the touch panel (e.g. a semi in-cell touch panel).

The "first threshold" is preferably set to be less than the absolute value of a positive voltage value of the drive signal in the third period.

The touch panel control unit can alternatively be configured to generate the drive signal such that the signal voltage is equal to 0 [V] in the fourth period.

The "second threshold" is preferably set to be less than the absolute value of a negative voltage value of the drive signal in the fifth period.

The touch panel control unit can alternatively be configured to generate the drive signal such that the signal voltage is equal to 0 [V] in the sixth period.

According to a sixth aspect of the invention, the touch panel control unit in any one of the first to third aspects of the invention generates the drive signal such that (1) a period T11 of driving the drive electrode in the period T1 of scanning the touch panel once includes a third period with positive signal voltage and a fourth period with signal voltage having an absolute value not more than a third threshold, and (2) in a period T11 of not driving the drive electrode in the period T1 of scanning the touch panel once, signal voltage has an absolute value not more than a fourth threshold.

The touch panel control unit controls the sense electrode to have positive potential in the period T11 of not driving the drive electrode in the period T1 of scanning the touch panel once.

The touch panel device can thus appropriately prevent generation of an electric field between the drive electrode and the sense electrode unevenly in one direction while the touch panel is scanned once. The touch panel device is configured to generate the drive signal as described above to prevent the electrons contained in the glue applied onto the touch panel first layer (sense electrode layer) provided with the sense electrode from shifting unevenly in one direction (toward the sense electrode). In the touch panel device, the sense electrode made of the transparent conductive film (e.g. ITO) is thus reduced on a surface thereof (by oxidation-reduction reaction) to appropriately prevent refractive index change of the sense electrode portion and appropriately prevent discoloration of the touch panel (e.g. a semi in-cell touch panel).

The "third threshold" is preferably set to be less than the absolute value of the positive voltage value of the drive signal in the third period.

The touch panel control unit can alternatively be configured to generate the drive signal such that the signal voltage is equal to 0 [V] in the fourth period.

The "fourth threshold" is preferably set to be less than the absolute value of the positive voltage value of the drive signal in the third period as well as to be less than the absolute value of positive potential of the sense electrode in the period T11.

The touch panel control unit can alternatively be configured to generate the drive signal such that the signal voltage is equal to 0 [V] in the period T11.

INDUSTRIAL APPLICABILITY

The present invention achieves the touch panel device configured to execute touch panel drive processing while appropriately preventing discoloration of the semi in-cell touch panel, is thus useful it the industrial field relevant to touch panel devices, and can be embodied in the field.

REFERENCE SIGN LIST

1000 Touch an display device (Touch panel device)
TP Touch panel
1 Touch and controller (Touch panel control unit)
Tx11 to Tx38 Drive electrode
Rx11 to Rx38 Sense electrode

The invention claimed is:
1. A touch panel device comprising:
   a color filter glass layer to be provided with a color filter;
   a glue layer containing electrons;
   a touch panel including (1) a touch panel first layer disposed on the color filter glass layer and provided with a sense electrode made of a transparent conductive film, and (2) a touch panel second layer provided with a drive electrode; and
   a touch panel control unit configured to generate a drive signal such that an integrated value of a potential difference between the drive electrode and the sense electrode is less than a predetermined value in a predetermined period of driving the touch panel, the drive signal being generated to prevent the electrons contained in the glue layer applied onto the sense electrode layer from shifting unevenly in one direction toward the sense electrode during two scan processing periods of the touch panel, wherein
   the touch panel control unit is configured to generate the drive signal such that
   (1) the period of driving the drive electrode in a period T1 of scanning the touch panel once includes a third period with positive signal voltage and a fourth period with signal voltage having an absolute value not more than a first threshold, and
   (2) the period of driving the drive electrode in a period T2, subsequent to the period T1, of scanning the touch panel once includes a fifth period with negative signal voltage and a sixth period with signal voltage having an absolute value not more than a second threshold.

2. The touch panel device according to claim 1, wherein the drive electrode in the touch panel second layer is provided as a mesh pattern electrode made of thin metallic wires or an electrode made of indium tin oxide.

3. The touch panel device according to claim 1, wherein the touch panel second layer is arranged to oppose the touch panel first layer with the color filter glass layer interposed there between.

4. A touch panel device comprising; The touch panel device according to claim 1, wherein
   a color filter glass layer to be provided with a color filter;
   a glue layer containing electrons;
   a touch panel including (1) a touch panel first layer disposed on the color filter glass layer and provided with a sense electrode made of a transparent conductive film, and (2) a touch panel second layer provided with a drive electrode; and
   a touch panel control unit configured to generate a drive signal such that an integrated value of a potential difference between the drive electrode and the sense electrode is less than a predetermined value in a predetermined period of driving the touch panel, the drive signal being generated to prevent the electrons contained in the glue layer applied onto the sense electrode layer from shifting unevenly in one direction toward the sense electrode during two scan processing periods of the touch panel, wherein
   the touch panel control unit is configured
   to generate the drive signal such that
   (1) a period T10 of driving the drive electrode in a period T1 of scanning the touch panel once includes a third period with positive signal voltage and a fourth period with signal voltage having an absolute value not more than a third threshold, and
   (2) the absolute value of the signal voltage is not more than a fourth threshold in a period T11 of not driving the drive electrode in the period T1 of scanning the touch panel once, and
   to control the sense electrode to have positive potential in the period T11 of not driving the drive electrode in the period T1 of scanning the touch panel once.

5. The touch panel device according to claim 4, wherein the drive electrode in the touch panel second layer is provided as a mesh pattern electrode made of thin metallic wires or an electrode made of indium tin oxide.

6. The touch panel device according to claim 4, wherein the touch panel second layer is arranged to oppose the touch panel first layer with the color filter glass layer interposed there between.

* * * * *